(12) United States Patent
Lee et al.

(10) Patent No.: US 11,169,568 B2
(45) Date of Patent: Nov. 9, 2021

(54) DISPLAY DEVICE

(71) Applicant: Samsung Display Co., Ltd., Yongin-si (KR)

(72) Inventors: Tae Hee Lee, Hwaseong-si (KR); Sung Kook Park, Suwon-si (KR); So Hee Park, Cheonan-si (KR); Hee Seomoon, Hwaseong-si (KR); Won Ki Hong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/364,142

(22) Filed: Mar. 25, 2019

(65) Prior Publication Data

US 2020/0042043 A1 Feb. 6, 2020

(30) Foreign Application Priority Data

Jul. 31, 2018 (KR) ........................ 10-2018-0089474

(51) Int. Cl.
*G06F 1/16* (2006.01)
*G06F 3/041* (2006.01)
*H05K 5/00* (2006.01)

(52) U.S. Cl.
CPC .......... *G06F 1/1626* (2013.01); *G06F 1/1601* (2013.01); *G06F 3/0414* (2013.01); *H05K 5/0017* (2013.01)

(58) Field of Classification Search
CPC ... H05K 5/0017; G06F 1/1601; G06F 3/0414; G06F 1/1626
See application file for complete search history.

(56) References Cited

U.S. PATENT DOCUMENTS

| 8,698,777 | B2 | 4/2014 | Endo et al. |
| 10,409,430 | B2* | 9/2019 | Heo ................. G02F 1/133308 |
| 10,437,374 | B2* | 10/2019 | Lee ...................... H05K 5/0017 |
| 10,481,713 | B2* | 11/2019 | Jo ......................... H05K 5/0247 |
| 10,546,551 | B2* | 1/2020 | Park ......................... G06F 3/016 |
| 2010/0079395 | A1* | 4/2010 | Kim ..................... G06F 1/1626 345/173 |
| 2013/0155627 | A1 | 6/2013 | Mareno et al. |

(Continued)

FOREIGN PATENT DOCUMENTS

| EP | 1983411 | 10/2008 |
| EP | 2993873 | 9/2016 |

(Continued)

OTHER PUBLICATIONS

Extended European Search Report dated Sep. 6, 2019, in European Patent Application No. 19168088.3.

(Continued)

*Primary Examiner* — Abhishek M Rathod
*Assistant Examiner* — Keith DePew
(74) *Attorney, Agent, or Firm* — H.C. Park & Associates, PLC

(57) ABSTRACT

A display device includes a display panel, a middle frame, and a first pressure sensor. The middle frame is disposed under the display panel. The middle frame includes a first accommodating groove extending along a first long side of the display panel. The first pressure sensor is disposed in the first accommodating groove.

20 Claims, 30 Drawing Sheets

(56) References Cited

U.S. PATENT DOCUMENTS

| | | | |
|---|---|---|---|
| 2014/0085213 A1* | 3/2014 | Huppi | G06F 3/0445 |
| | | | 345/173 |
| 2014/0092064 A1 | 4/2014 | Bernstein et al. | |
| 2015/0070287 A1* | 3/2015 | Ojala | G06F 3/04142 |
| | | | 345/173 |
| 2015/0346881 A1* | 12/2015 | Watazu | G06F 3/045 |
| | | | 345/174 |
| 2016/0062517 A1 | 3/2016 | Meyer et al. | |
| 2017/0045976 A1* | 2/2017 | Bushnell | G06F 3/04142 |
| 2017/0052623 A1* | 2/2017 | Park | G06F 1/1626 |
| 2017/0090637 A1* | 3/2017 | Yoon | H04M 1/0266 |
| 2018/0039353 A1* | 2/2018 | Taka | G06F 1/1671 |
| 2018/0081400 A1* | 3/2018 | Pandya | F16J 15/064 |
| 2018/0095574 A1* | 4/2018 | Kim | G06F 1/1677 |
| 2018/0143669 A1 | 5/2018 | Bok et al. | |
| 2018/0160545 A1 | 6/2018 | Kim et al. | |
| 2018/0188874 A1* | 7/2018 | Cho | G01L 1/205 |
| 2018/0210602 A1* | 7/2018 | Lee | H05K 5/03 |
| 2018/0232092 A1* | 8/2018 | Lee | G06F 21/31 |
| 2019/0004651 A1* | 1/2019 | Hong | G06F 3/0443 |
| 2019/0014664 A1* | 1/2019 | Ahn | G02F 1/133345 |
| 2019/0163003 A1* | 5/2019 | Kim | G02F 1/13338 |
| 2019/0259819 A1* | 8/2019 | Lee | G06F 3/0443 |
| 2019/0302924 A1* | 10/2019 | Kim | G06F 3/041 |
| 2019/0302939 A1* | 10/2019 | Hong | G02F 1/133308 |
| 2019/0317634 A1* | 10/2019 | Lee | G06F 3/0416 |
| 2019/0346957 A1* | 11/2019 | Hong | G06F 3/041 |
| 2019/0353540 A1* | 11/2019 | Hong | G06F 3/04142 |
| 2020/0042131 A1* | 2/2020 | Lee | G06F 3/04142 |
| 2020/0057523 A1* | 2/2020 | Park | G06F 3/0416 |
| 2020/0201503 A1* | 6/2020 | Lee | G01L 1/04 |

FOREIGN PATENT DOCUMENTS

| | | |
|---|---|---|
| JP | 5026486 | 9/2012 |
| KR | 10-2016-0141304 | 12/2016 |
| KR | 10-2016-0149982 | 12/2016 |
| KR | 10-1841583 | 3/2018 |
| WO | 2015047360 | 4/2015 |

OTHER PUBLICATIONS

Office Action dated Aug. 19, 2021, in European Patent Application No. 19168088.3.

* cited by examiner

DISPLAY DEVICE

CROSS-REFERENCE TO RELATED APPLICATION

This application claims priority from and the benefit of Korean Patent Application No. 10-2018-0089474, filed Jul. 31, 2018, which is hereby incorporated by reference for all purposes as if fully set forth herein.

BACKGROUND

Field

Exemplary embodiments generally relate to a display device.

Discussion

A display device for displaying an image can be used for various electronic appliances for providing an image to a user, such as smart phones, tablet personal computers (PCs), digital cameras, notebook computers, navigators, televisions, etc. The display device typically includes a display panel for generating and displaying an image and various input devices. For instance, in the fields of smart phones and tablet PCs, a touch panel for recognizing a touch input has been applied to a display device. The touch panel has a trend to replace existing physical input devices, such as keypads, joysticks, etc., at least because of the convenience of touching. Further, ongoing research is being conducted to implement various inputs by mounting a pressure sensor in addition to the touch panel on (or in) a display device.

The above information disclosed in this section is only for understanding the background of the inventive concepts, and, therefore, may contain information that does not form prior art.

SUMMARY

Some exemplary embodiments provide a display device capable of preventing water and dust permeation even when a pressure sensor is disposed at an edge of a display panel.

Additional aspects will be set forth in the detailed description which follows, and, in part, will be apparent from the disclosure, or may be learned by practice of the inventive concepts.

According to some exemplary embodiments, a display device includes a display panel, a middle frame, and a first pressure sensor. The middle frame is disposed under the display panel. The middle frame includes a first accommodating groove extending along a first long side of the display panel. The first pressure sensor is disposed in the first accommodating groove.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts. In the drawings.

DETAILED DESCRIPTION OF THE ILLUSTRATED EMBODIMENTS

Figure 1:
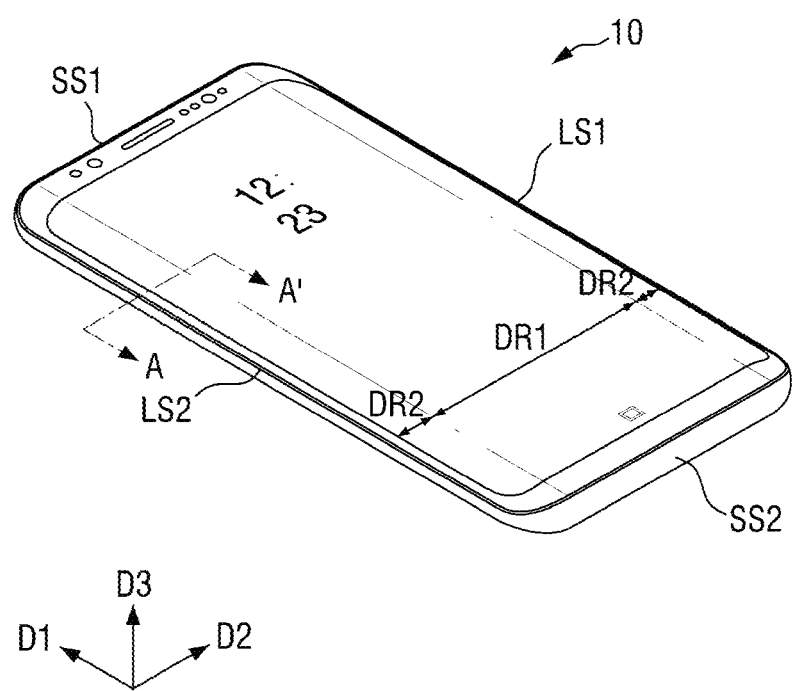
FIG. 1 is a perspective view of a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts. To this end, the same or similar parts throughout the specification are denoted by the same or similar reference numerals.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the D1-axis, the D2-axis, and the D3-axis are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

Figure 2:
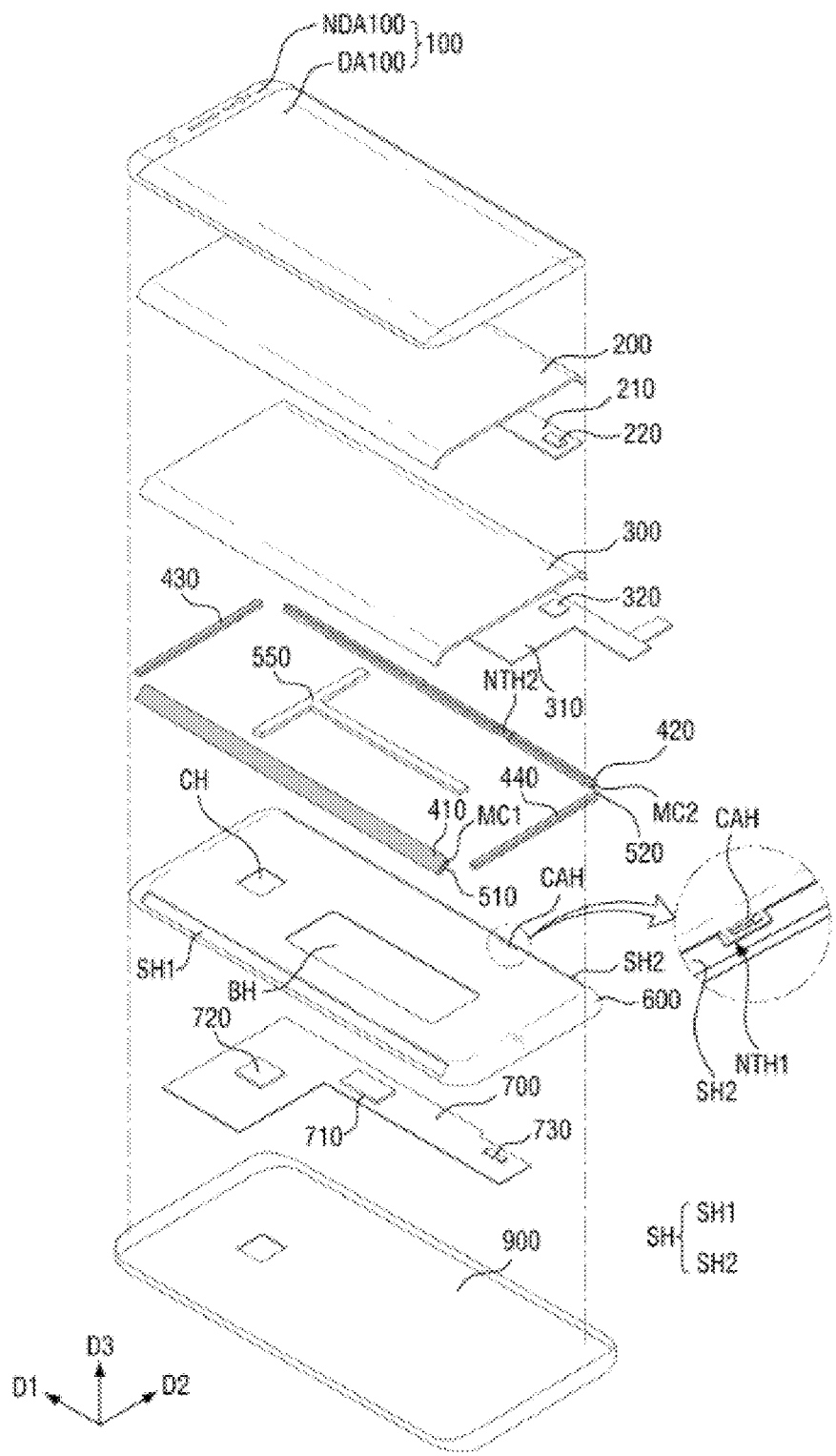
FIG. 2 is an exploded perspective view of the display device of FIG. 1 according to some exemplary embodiments.

FIG. 1 is a perspective view of a display device according to some exemplary embodiments. FIG. 2 is an exploded perspective view of the display device of FIG. 1 according to some exemplary embodiments.

Referring to FIGS. 1 and 2, a display device 10 according to some exemplary embodiments includes a cover window 100, a touch sensing unit 200, a touch circuit board 210, a touch driving unit 220, a display panel 300, a display circuit board 310, a display driving unit 320, a first waterproofing member 410, a second waterproofing member 420, a third waterproofing member 430, a fourth waterproofing member 440, a first accommodating groove cover MC1, a second accommodating groove cover MC2, a first pressure sensor 510, a second pressure sensor 520, a middle frame 600, a main circuit board 700, and a lower cover 900.

Unless otherwise defined, for the purposes of this disclosure only, the terms "on," "over," "upper side," and "upper surface" in the thickness direction refers to a display surface side or a third direction D3 side with respect to the display panel 300, and the terms "beneath," "under," "lower side," and "lower surface" refer to a side opposite to the display surface side or a direction opposite to the third direction D3 side with respect to the display panel 300. Further, the terms "upper," "lower," "left," and "right" in the plane direction indicate directions when viewed from above the display surface at a fixed position.

The display device 10 may have a substantially rectangular shape in a plan view. The display device 10 may have a rectangular shape with vertical (or well-defined) corners or a rectangular shape with rounded corners. The display device 10 may include both long sides LS1 and LS2 extending along the first direction D1 and both short sides SS1 and SS2 extending along the second direction D2. In a member such as the rectangular display device 10 or the display panel 300 included therein, a long side located at the right side in the plane is referred to as a first long side LS1, a long side located at the left side in the plane is referred to as a second long side LS1, a short side located at the upper side in the plane is referred to as a first short side SS1, and a short side located at the lower side in the plane is referred to as a second short side SS2. The lengths of the first and second long sides LS1 and LS2 of the display device 10 may be in the range of 1.5 to 2.5 times the lengths of the first and second short sides SS1 and SS2.

The display device 10 may include a first area DR1 and a second area DR2 that are placed on different planes. The first area DR1 is placed in a first plane. The second area DR2 is connected to the first area DR1 and is bent or curved therefrom. The second area DR2 may be placed on a second plane having a predetermined intersection angle with the first plane or may have a curved surface. In the display device 10, the second area DR2 is disposed around the first area DR1; however, exemplary embodiments are not limited thereto. The first area DR1 of the display device 10 is used as a main display surface. In some exemplary embodiments, not only the first area DR1, but also the second area DR2 may be used as a display area of the display device 10. Hereinafter, a case where the first area DR1 of the display device 10 is a flat portion and the second area DR2 of the display device 10 is a curved portion will be described as an example, but exemplary embodiments are not limited thereto.

The second area DR2, which is a curved portion, may have a constant curvature, or may have a shape in which the curvature changes. The second area DR2 may be disposed at the edge of the display device 10. In some exemplary embodiments, the second area DR2 may be disposed at the edges of both the first and second long sides LS1 and LS2 of the display device 10 that face each other. However, exemplary embodiments are not limited thereto. For instance, the second area DR2 may be disposed at the edge of one side of the display device 10, may be disposed at both the first and second short sides SS1 and SS2 of the display device 10, may be disposed at the edges of three sides of the display device 10, or may be disposed at the edges of all sides of the display device 10.

Figure 6:
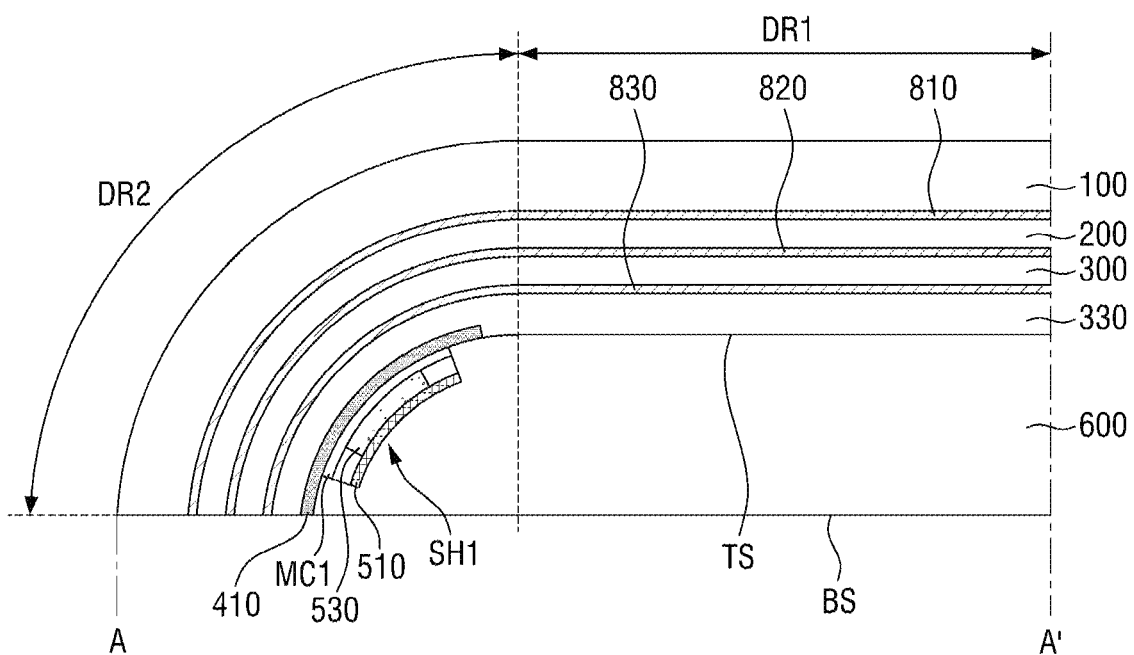
FIG. 6 is a cross-sectional view taken along sectional line A-A' of FIG. 1 according to some exemplary embodiments.

The cover window 100 may be disposed on the display panel 300 so as to cover the upper surface of the display panel 300. Thus, the cover window 100 may function to protect the upper surface of the display panel 300. The cover window 100 may be attached to the touch sensing unit 200 through a first adhesive layer 810 as shown in FIG. 6. The first adhesive layer 810 may be an optically clear adhesive (OCA) film or an optically clear resin (OCR) film.

The cover window 100 may include a light transmitting portion DA100 corresponding to the display panel 300 and a light blocking portion NDA100 corresponding to an area other than the display panel 300. The cover window 100 may be disposed in the first area DR1 and the second area DR2, and the light transmitting portion DA100 may be disposed in a part of the first area DR1 and a part of the second area DR2.

The cover window 100 may be larger than the display panel 300. For example, the cover window 100 may protrude outward from the display panel 300 at both the first and second short sides SS1 and SS2 of the display device 10. Although the cover window 100 may protrude from the display panel 300 even at both the first and second long sides LS1 and LS2 of the display device 10, the protruding distance at both the first and second short sides SS1 and SS2 of the display device 10 may be greater than the protruding distance at both the first and second long sides SS1 and SS2 of the display device 10.

The light blocking portion NDA100 of the cover window 100 may be formed to be opaque or the light blocking portion NDA100 of the cover window 100 may be formed as a decorative layer having a pattern that can be seen to a user when an image is not displayed. For example, a company logo such as "SAMSUNG" or various characters may be patterned on the light blocking portion NDA100 of the cover window 100.

The cover window 100 may be made of glass, sapphire, and/or plastic; however, exemplary embodiments are not limited thereto. The cover window 100 may be rigid or flexible.

The touch sensing unit 200 may be disposed between the cover window 100 and the display panel 300. The touch sensing unit 200 may be disposed in the first area DR1 and the second area DR2. Thus, the touch sensing unit 200 may sense a user's touch in the second area DR2, as well as the first area DR1. The touch sensing unit 200 may have substantially the same size as the display panel 300 and may overlap the display panel 300. For example, the side surface of the display panel 300 may be aligned with the side surface of the touch sensing unit 200. However, exemplary embodiments are not limited thereto. The touch sensing unit 200 may be attached to the lower surface of the cover window 100 through the first adhesive layer 810. The touch sensing unit 200 may be additionally provided on the display panel 300 with a polarizing film in order to prevent the deterioration of visibility due, for instance, to the reflection of external light. In this case, the polarizing film may be attached to the lower surface of the cover window 100 through the first adhesive layer 810.

The touch sensing unit 200 is a unit for sensing a touch position of a user, and may be implemented as a capacitive type, such as a self-capacitance type or a mutual capacitance type. When touch sensing unit 200 is implemented as a self-capacitive type, the touch sensing unit 200 may include only touch driving electrodes, but when the touch sensing unit 200 is implemented as a mutual capacitance type, the touch sensing unit 200 may include both touch driving electrodes and touch sensing electrodes. Hereinafter, the touch sensing unit 200 will be described assuming that the touch sensing unit 200 is implemented as a mutual capacitance type.

The touch sensing unit 200 may be a rigid panel type, a flexible panel type, or a film type. The touch sensing unit 200 may be attached onto the display panel 300 through a second adhesive layer 820 (see FIG. 6). The second adhesive layer 820 may be an optically clear adhesive (OCA) film or an optically clear resin (OCR) film. The touch sensing unit 200 may be formed integrally with the display panel 300. In this case, the touch driving electrodes and touch sensing electrodes of the touch sensing unit 200 may be disposed inside or otherwise part of the display panel 300, e.g., the touch sensing unit 200 may be disposed directly on an outermost surface of the display panel 300 without the use of a separate adhesive layer via formation of the touch sensing unit 200 through a continuous process of formation of the display panel 300.

The touch circuit board 210 may be attached to one side of the touch sensing unit 200. For instance, the touch circuit board 210 may be attached onto pads (not shown) provided on one side of the touch sensing unit 200 using an anisotropic conductive film. Further, the touch circuit board 210 may be provided with a touch connection portion, and the touch connection portion may be connected to a connector of the display circuit board 310. The touch circuit board 210 may be a flexible printed circuit board; however, exemplary embodiments are not limited thereto.

The touch driving unit 220 may apply touch driving signals to the touch sensing unit 200, sense sensing signals from the touch sensing unit 200, and analyze the sensing signals to calculate (or otherwise determine) a touch position of the user. The touch driving unit 220 may be formed as an integrated circuit and may be mounted on the touch circuit board 210.

The display panel 300 may be disposed under the touch sensing unit 200. The display panel 300 may be disposed to overlap the light transmitting portion DA100 of the touch sensing unit 200. Thus, the image of the display panel 300 may be seen not only in the first area DR1, but also in the second areas DR2.

The display panel 300 is a panel for displaying an image, and may be a light emitting display panel including a light emitting element. For example, the display panel 300 may include an organic light emitting display panel using an organic light emitting diode, an ultra-small light emitting diode display panel using a micro light emitting diode, or a quantum dot light emitting diode display panel using a quantum dot light emitting diode. However, exemplary embodiments are not limited thereto, and different kinds of display panels, such as a liquid crystal display panel, an electrophoretic display panel, etc., may be used. In the following description, exemplary embodiments will be described in association with a case where an organic light emitting display panel is applied as the display panel 300.

The display panel 300 includes a plurality of organic light emitting elements arranged on a substrate. The substrate may be a rigid substrate made of glass, quartz, or the like, or a flexible substrate made of polyimide or other polymer resin. When a polyimide substrate is used as the substrate, the display panel 300 may be bent, warped, folded, rolled, etc., and thus, the display panel 300 may be implemented in various forms.

The display circuit board 310 may be attached to one side of the display panel 300. For instance, the display circuit board 310 may be attached to pads (not shown) provided on one side of the display panel 300 using an anisotropic conductive film. The touch circuit board 210 may also be bent to the lower surface of the display panel 300, and the touch connection portion disposed at one end of the touch circuit board 210 may be connected to a connector of the display circuit board 310. More details of the display circuit board 310 will be described later with reference to FIGS. 3 and 4.

The display driving unit 320 outputs signals and voltages for driving the display panel 300 through the display circuit board 310. The display driving unit 320 may be formed as an integrated circuit and mounted on the display circuit board 310, but exemplary embodiments are not limited thereto. For example, the display driving unit 320 may be attached to one side of the upper surface or lower surface of the substrate of the display panel 300.

A panel lower member 330 may be disposed under the display panel 300 as shown in FIG. 6. The panel lower member 330 may be attached to the lower surface of the display panel 300 through a third adhesive layer 830. The third adhesive layer 830 may be an optically clear adhesive (OCA) film or an optically clear resin (OCR) film.

The panel lower member 330 may include at least one of a light absorbing layer for absorbing external light, a buffer layer for absorbing an external impact, a heat dissipating layer for efficiently emitting heat of the display panel 300, and a light blocking layer for blocking external light.

The light absorbing member may be disposed under the display panel 300. The light absorbing member inhibits the transmission of light to prevent components disposed under the light absorbing member, such as, a first waterproofing member 410, a second waterproofing member 420, a third waterproofing member 430, a fourth waterproofing member 440, and the display circuit board 310 from being viewed from above the display panel 300. The light absorbing member may include a light absorbing material, such as a black pigment or a dye.

A buffer member may be disposed under the light absorbing member. The buffer member absorbs an external impact to prevent the display panel 300 from being damaged. The buffer member may be composed of a single layer or a plurality of layers. For example, the buffer member may be formed of a polymer resin, such as polyurethane, polycarbonate, polypropylene, or polyethylene, or may be formed of an elastic material, such as a rubber, a urethane material, or a sponge formed by foaming an acrylic material. The buffer member may be a cushion layer.

The heat dissipating member may be disposed under the buffer member. The heat dissipating member may include a first heat dissipating layer including graphite or carbon nanotubes, and a second heat dissipating layer capable of blocking electromagnetic waves and formed of a metal thin film of copper, nickel, ferrite, or silver having excellent thermal conductivity.

Figure 3:
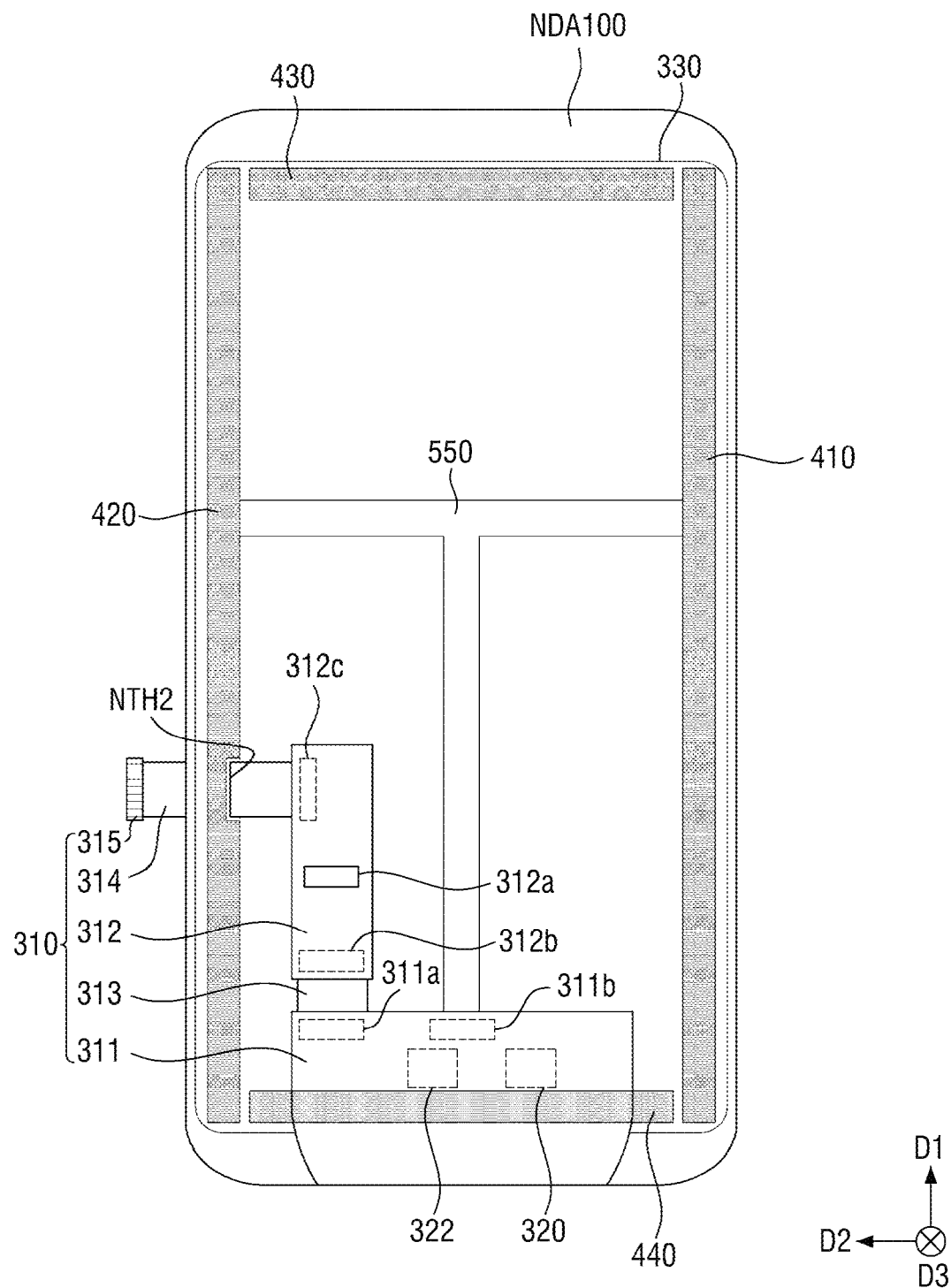
FIG. 3 is a bottom view of a display device before a middle frame is assembled thereto according to some exemplary embodiments.

The middle frame 600 may be disposed under the panel lower member 330. The middle frame 600 may include a synthetic resin, a metal, or both a synthetic resin and a metal. The middle frame 600 includes a first area DR1 and a second area DR2 that are located on different planes with respect to the display device 10. The first area DR1 of the middle frame 600 may provided with a camera hole CH into which a camera device is inserted and a battery hole BH through which heat is discharged from a battery, and the second area DR2 of the middle frame 600 may be provided with a cable hole CAH through which a second connection cable 314 connected to the display circuit board 310 passes as shown in FIG. 3. For example, the cable hole CAH may be disposed at the right edge of the middle frame 600. However, exemplary embodiments are not limited thereto.

The second area DR2 of the middle frame 600 may be provided with one or more accommodating grooves SH. The accommodating grooves SH may be disposed at the left and right edges of the second area DR2. For example, a first accommodating groove SH1 may be disposed along the second long side LS2 at the left edge of the second area DR2, and a second accommodating groove SH2 may be disposed along the first long side LS1 at the right edge of the second region DR2. However, exemplary embodiments are not limited thereto, and the accommodating groove SH may be disposed only at any one of the left edge and right edge of the second area DR2, or any other suitable location.

In some exemplary embodiments, the accommodating groove SH may be disposed along the first short side SS1 at the upper edge of the first area DR1 or along the first short side SS2 at the lower edge of the first region DR1, the accommodating grooves SH may be disposed along both the first and second short sides SS1 and SS2 at the upper and lower edges of the first area DR1, and the accommodating grooves SH may be disposed at the upper and lower edges of the first area DR1 and at the left and right edges of the second area DR2, respectively.

According to some exemplary embodiments, at least one of the first accommodating groove SH1 and the second accommodating groove SH2 may be disposed to bypass the cable hole CAH, and thus, may include a first concave portion NTH1 formed in a notch shape. Hereinafter, a case where the second accommodating groove SH2 includes the first concave portion NTH1 will be described as an example, but exemplary embodiments are not limited thereto.

The first pressure sensor 510, the first accommodating groove cover MC1, and the first waterproofing member 410 may be disposed over the first accommodating groove SH1. For example, the first pressure sensor 510 may be mounted inside the first accommodating groove SH1, the first accommodating groove cover MC1 may be engaged to cover the first accommodating groove SH1 in which the first pressure sensor 510 may be mounted, and the first waterproofing member 410 may be attached to a region where the first accommodating groove SH1 and the first accommodating groove cover MC1 are engaged to each other.

In some exemplary embodiments, the first pressure sensor 510 may have a smaller size than the first accommodating groove SH1 to be mounted in the first accommodating groove SH1, the first accommodating groove cover MC1 may have the same or a smaller size than the first accommodating groove SH1 to be engaged with the first accommodating groove SH1, and the first waterproofing member 410 may have a larger size than the first accommodating groove SH1 to prevent moisture from penetrating into the first accommodating groove SH1. However, exemplary embodiments are not limited thereto.

To engage the first accommodating groove SH1 and the first accommodating groove cover MC1, the first accommodating groove SH1 and the first accommodating groove cover MC1 may further include an engaging member, and the first accommodating groove SH1 and the first accommodating groove cover MC1 may be attached to each other through an adhesive member.

The second pressure sensor 520, the second accommodating groove cover MC2, and the second waterproofing member 420 may be disposed over the second accommodating groove SH2. For example, the second pressure sensor 520 may be mounted inside the second accommodating groove SH2, the second accommodating groove cover MC2 may be engaged to cover the second accommodating groove SH2 in which the second pressure sensor 520 may be mounted, and the second waterproofing member 420 may be attached to a region where the second accommodating groove SH2 and the second accommodating groove cover MC2 are engaged to each other.

In some exemplary embodiments, each of the second pressure sensor 520, the second accommodating groove cover MC2, and the second waterproofing member 420 may be provided with a second concave portion NTH2 corresponding to the first concave portion NTH1 of the second accommodating groove SH2. However, exemplary embodiments are not limited thereto, and only some of the second pressure sensor 520, the second accommodating groove cover MC2, and the second waterproofing member 420 may be provided with the second concave portion NTH2 depending on the position of the second concave portion NTH2 and the second accommodating groove SH2, and each of the second pressure sensor 520, the second accommodating groove cover MC2, and the second waterproofing member 420 may not be provided with the second concave portion NTH2.

In some exemplary embodiments, the second pressure sensor 520 may have a smaller size than the second accommodating groove SH2 to be mounted in the second accommodating groove SH2, the second accommodating groove cover MC2 may have the same or a smaller size than the second accommodating groove SH2 to be engaged with the second accommodating groove SH2, and the second waterproofing member 420 may have a larger size than the second accommodating groove SH2 to prevent moisture from penetrating into the second accommodating groove SH2. However, exemplary embodiments are not limited thereto.

To engage the second accommodating groove SH2 and the second accommodating groove cover MC2, the second accommodating groove SH2 and the second accommodating groove cover MC2 may further include an engaging member, and the second accommodating groove SH2 and the second accommodating groove cover MC2 may be attached to each other through an adhesive member.

Since the first pressure sensor 510 and the second pressure sensor 520 are disposed in the second area DR2 of the middle frame 600, when pressure is applied to the second area DR2, the first pressure sensor 510 and the second pressure sensor 520 may sense the applied pressure. Further, since the first pressure sensor 510 and the second pressure sensor 520 are respectively mounted in the first accommodating groove SH1 and second accommodating groove SH2 of the middle frame 600, it is possible to eliminate a step according to the arrangement of the first pressure sensor 510 and the second pressure sensor 520. Thus, the sensitivity of the pressure sensor is improved, and the malfunction due to moisture infiltration is prevented.

The panel lower member 330 of the display panel 300, the third waterproofing member 430, and the fourth waterproofing member 440 are disposed on the first area DR1 of the middle frame 600. That is, the first waterproofing member 410 and the second waterproofing member 420 are disposed on the second areas DR2 in which the first pressure sensor 510 and second pressure sensor 520 of the middle frame 600, and the third waterproofing member 430, the fourth waterproofing member 440, and the panel lower member 330 are disposed on the first area DR1.

The first waterproofing member 410 is attached to the lower surface of the panel lower member 330 disposed under the display panel 300, the middle frame 600, and the upper surface of the first accommodating groove cover MC1. Thus, the left edge of the display panel 300, the left edge of the middle frame 600, and the first accommodating groove cover MC1 may be attached to each other by the first waterproofing member 410. The second waterproofing member 420 is attached to the lower surface of the panel lower member 330 disposed under the display panel 300, the middle frame 600, and the upper surface of the second accommodating groove cover MC2. Thus, the right edge of the display panel 300, the right edge of the middle frame 600, and the second accommodating groove cover MC2 may be attached to each other by the second waterproofing member 420. Further, the third waterproofing member 430 may be disposed under the display panel 300 at the upper edge of the display panel 300, and the fourth waterproofing member 440 may be disposed under the display panel 300 at the lower edge of the display panel 300. The third waterproofing member 430 and the fourth waterproofing member 440 may be disposed to face each other.

Each of the first waterproofing member 410, the second waterproofing member 420, the third waterproofing member 430, and the fourth waterproofing member 440 may include a base film and adhesive layers disposed on both sides of the base film. The base film may be a polyethylene terephthalate (PET) film, a cushion layer, or a polyethylene foam (PE-foam). The adhesive layer may be a pressure-sensitive adhesive layer.

The main circuit board 700 may be disposed under the middle frame 600. The main circuit board 700 may be a printed circuit board or a flexible printed circuit board. The main circuit board 700 may include a main processor 710, a camera device 720, and a main connector 730. The main processor 710 may be disposed on one surface of the main circuit board 700 facing the middle frame 600, whereas the main connector 730 may be disposed on the other surface of the main circuit board 700 facing the lower cover 900. The camera device 720 may be disposed on both the one surface and the other surface of the main circuit board 700. In this case, the upper surface of the camera device 720 may be disposed on the other surface of the main circuit board 700, and the lower surface thereof may be disposed on the one surface of the main circuit board 700.

The main processor 710 may control all or some of the functions of the display device 10. For example, the main processor 710 may output image data to the display driving unit 320 of the display circuit board 310 such that the display panel 300 displays an image. As another example, the main processor 710 may receive touch data from the touch driving unit 220, determine the touch position of a user, and execute an application indicated by an icon displayed at the touch position of the user. Further, the main processor 710 may receive pressure sensing data from the touch driving unit 220 or the display driving unit 320, and may control the display device 10 to output a home screen, to control the volume of a sound of the display device 10, to implement haptic feedback, etc. The main processor 710 may be an application processor, a central processing unit, or a system chip, which includes an integrated circuit.

The camera device 720 processes an image frame, such as a still image or a moving image obtained by an image sensor, in a camera mode, and outputs the processed image frame to the main processor 710.

The second connection cable 314 having passed through the cable hole CAH of the middle frame 600 may be connected to the main connector 730 disposed on the lower surface of the main circuit board 700 through a gap between the middle frame 600 and the main circuit board 700, as shown in FIG. 3. Thus, the main circuit board 700 can be electrically connected to the display circuit board 310 and the touch circuit board 210.

In addition, the main circuit board 700 may be further provided with a mobile communication module capable of transmitting and receiving a radio signal to/from at least one of a base station, an external terminal, and a server. The radio signal may include various types of data depending on a voice signal, a video call signal, a text/multimedia message, etc., transmission/reception. Further, the main circuit board 700 may be further provided with an acoustic output device capable of outputting sound and a vibration device capable of generating vibration for haptic implementation.

The lower cover 900 may be disposed under the middle frame 600 and the main circuit board 700. The lower cover 900 may form a lower surface appearance of the display device 10. The lower cover 900 may include plastic and/or metal.

Figure 4:
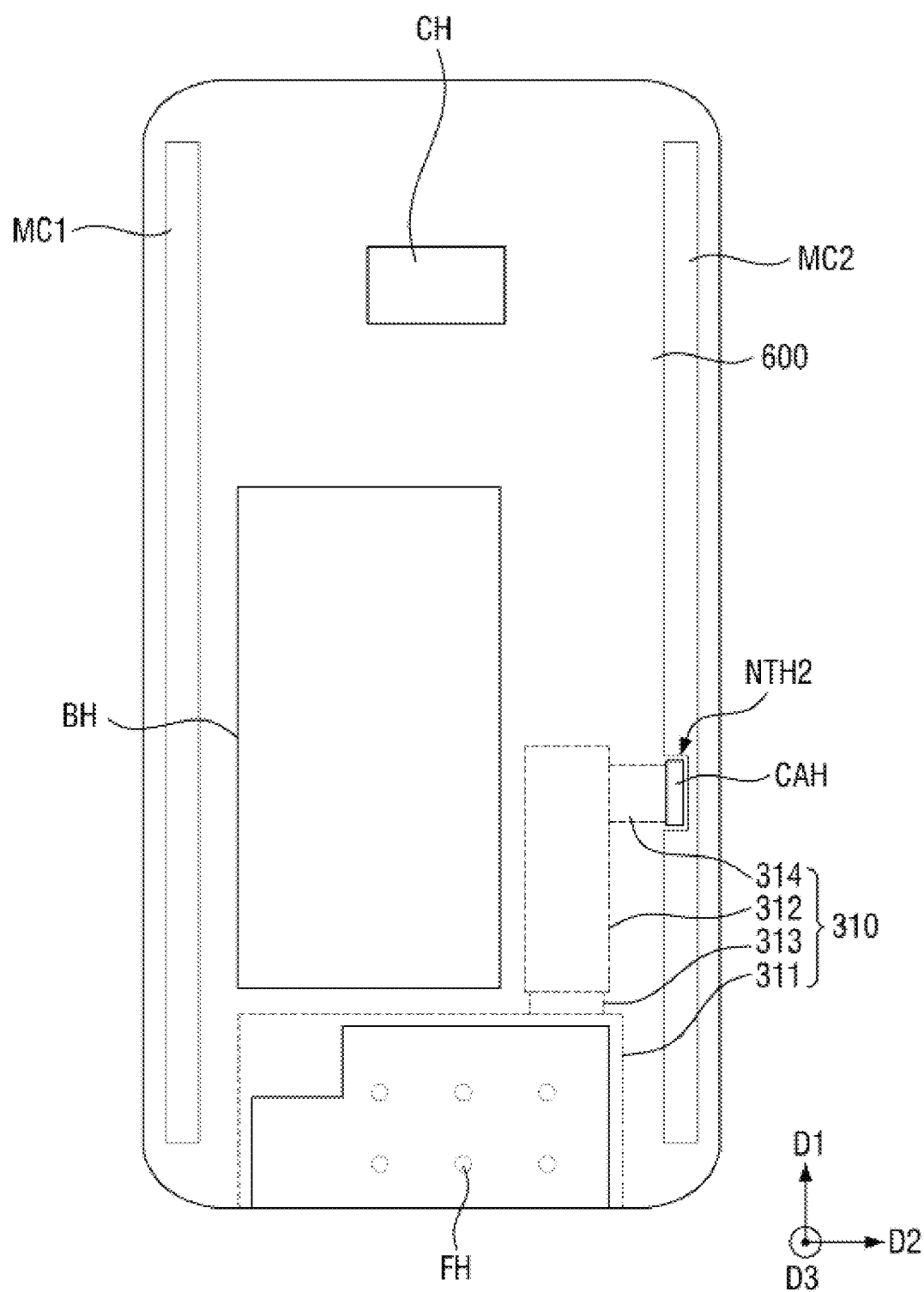
FIG. 4 is a plan view of a middle frame according to some exemplary embodiments.
Figure 5:
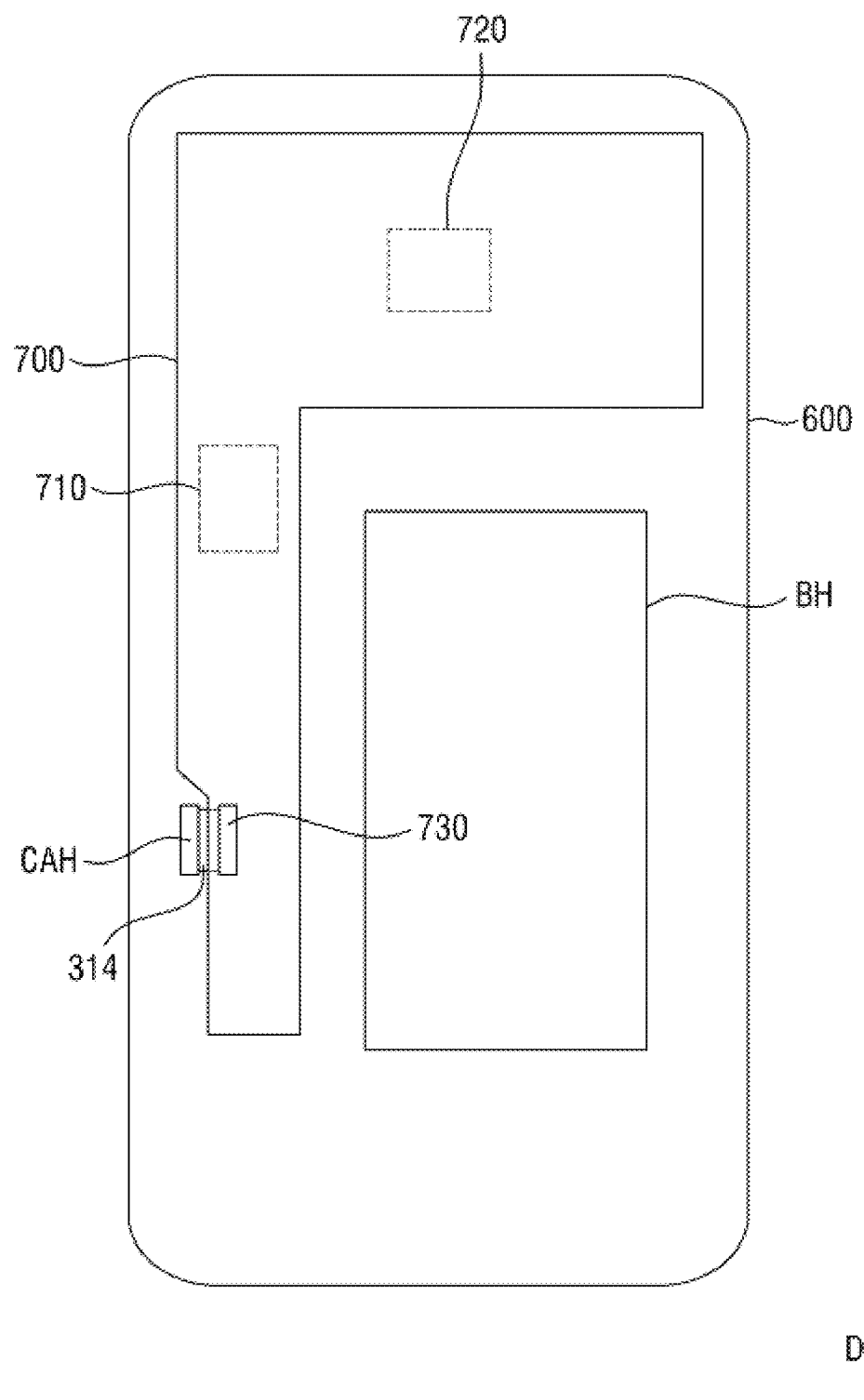
FIG. 5 is a bottom view of a middle frame and a main circuit board according to some exemplary embodiments.
Figure 5:
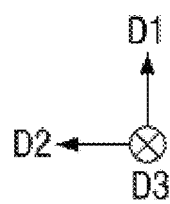

FIG. 3 is a bottom view of a display device before a middle frame is assembled thereto according to some exemplary embodiments. FIG. 4 is a plan view of a middle frame according to some exemplary embodiments. FIG. 5 is a bottom view of a middle frame and a main circuit board according to some exemplary embodiments.

Hereinafter, a connection relationship between the display circuit board 310 and the pressure sensing circuit board 550, and a connection relationship between the second connection cable 314 and the main connector 730 of the main circuit board 700 will be described in more detail with reference to FIGS. 3 to 5. Meanwhile, since FIG. 4 is a plan view, whereas FIGS. 3 and 5 are bottom views, it should be noted that it is shown in FIGS. 3 and 5 that the left and right sides of the display device 10 in FIG. 4 are reversed. For convenience of explanation, in FIG. 4, the display circuit board 310 is expressed by a dot-and-dash line.

Referring to FIGS. 3 to 5, the display circuit board 310 may include a first circuit board 311, a second circuit board 312, a first connection cable 313, a second connection cable 314, and a connector connection portion 315. The first circuit board 311 may be attached to one side of the upper surface or lower surface of the substrate of the display panel 300, and may be bent toward the lower surface of the substrate of the display panel 300. As shown in FIG. 4, the first circuit board 311 may be fixed to fixing holes FH formed in the middle frame 600 by fixing members. The first circuit board 311 may include a display driving unit 320, a pressure sensing unit 322, a first connector 311a, and a second connector 311b. The display driving unit 320, the pressure sensing unit 322, the first connector 311a, and the second connector 311b may be disposed on one surface of the first circuit board 311. The first connector 311a may be connected to one end of the first connection cable 313 connected to the second circuit board 312. Thus, the display driving unit 320 and the pressure sensing unit 322 mounted on the first circuit board 311 may be electrically connected to the second circuit board 312 through the first connection cable 313. The second connector 311b may be connected to one end of the pressure sensing circuit board 550 connected to the first pressure sensor 510 and the second pressure sensor 520. Thus, the first pressure sensor 510 and the second pressure sensor 520 may be electrically connected to the pressure sensing unit 322.

The second circuit board 312 may include a touch connector 312a, a first connection connector 312b, and a second connection connector 312c. The first connection connector 312b and the second connection connector 312c may be disposed on one surface of the second circuit board 312, and the touch connector 312a may be disposed on the other surface of the second circuit board 312. The touch connector 312a may be connected to one end of the touch circuit board 210. Thus, the touch driving unit 220 may be electrically connected to the second circuit board 312. The first connection connector 312b may be connected to the other end of the first connection cable 313 connected to the first circuit board 311. Thus, the display driving unit 320 and the pressure sensing unit 322 mounted on the first circuit board 311 may be electrically connected to the second circuit board 312 through the first connection cable 313. The second connection connector 312c may be connected to one end of a second connection cable 314 connected to the main connector 730 of the main circuit board 700. Thus, the second circuit board 312 may be electrically connected to the second circuit board 312 through the second connection cable 314.

A connector connection portion 315 may be formed at the other end of the second connection cable 314. The connector connection portion 315 of the second connection cable 314 may extend to the lower surface of the middle frame 600 through the cable hole CAH of the middle frame 600 as shown in FIGS. 3 and 4. Since each of the second waterproofing member 420, the second accommodating groove cover MC2, and the second pressure sensor 520 may be provided with a second concave portion NTH2 having a notch shape in a region corresponding to the cable hole CAH of the middle frame 600, the cable hole CAH of the middle frame 600 may be exposed without being covered by the second waterproofing member 420, the second accommodating groove cover MC2, and the second pressure sensor 520. Further, since a gap between the middle frame 600 and the main circuit board 700 is formed in a region corresponding to the cable hole CAH of the middle frame 600, the connector connection portion 315 of the second connection cable 314, having passed through the cable hole CAH, may come out of the gap between the middle frame 600 and the main circuit board 700, and may extend to the lower surface of the main circuit board 700. The connector connection portion 315 of the second connection cable 314 may be connected to the main connector 730 disposed on the lower surface of the main circuit board 700.

As described above, according to some exemplary embodiments, the second accommodating groove SH2 may have a first concave portion NTH1 configured to bypass the cable hole CAM of the middle frame 600, and each of the second waterproofing member 420, the second accommodating groove cover MC2, and the second pressure sensor 520, disposed over the second accommodating groove SH2 may have a second concave portion NTH2 having a notch shape so as not to cover the cable hole CAH of the middle frame 600. Thus, the second connection cable 314 connected to the display circuit board 310 may extend to the rear surface of the middle frame 600 through the cable hole CAH, and may be connected to the main connector 730 of the main circuit board 700. However, such connections and configurations are merely illustrative, and exemplary embodiments are not limited thereto.

Figure 7:
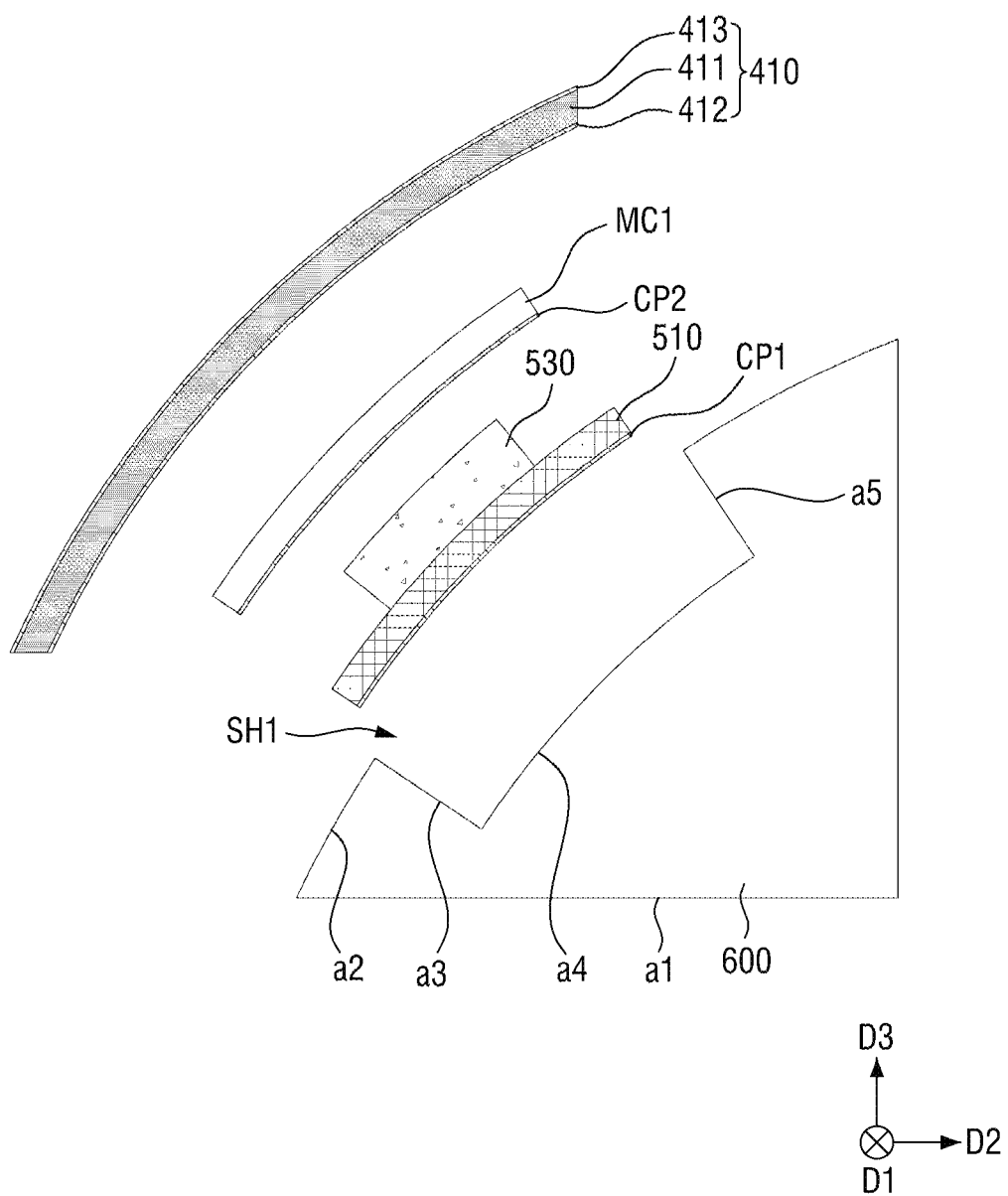
FIG. 7 is an exploded cross-sectional view of a second area of the middle frame of FIG. 6 according to some exemplary embodiments.
Figure 8:
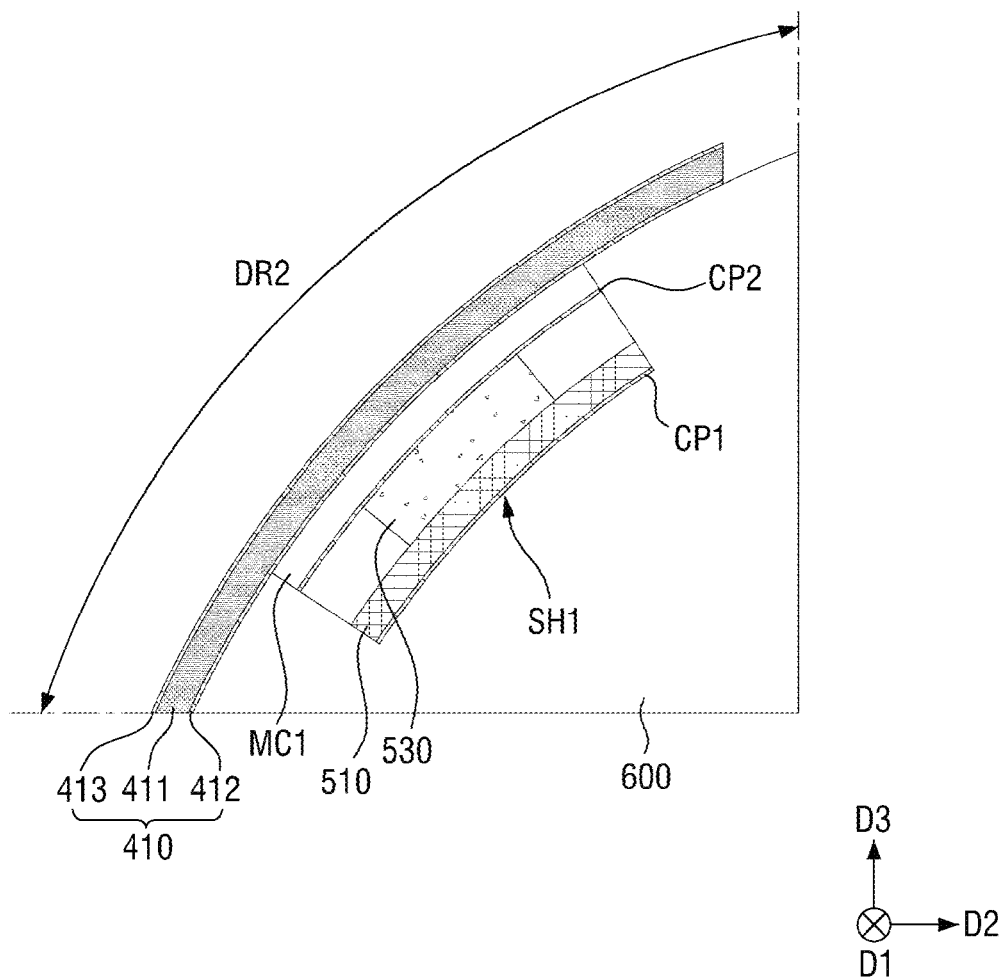
FIG. 8 is an enlarged view of a second area of the middle frame of FIG. 6 according to some exemplary embodiments.

FIG. 6 is a cross-sectional view taken along sectional line A-A' of FIG. 1 according to some exemplary embodiments. FIG. 7 is an exploded cross-sectional view of a second area of the middle frame of FIG. 6 according to some exemplary embodiments. FIG. 8 is an enlarged view of a second area of the middle frame of FIG. 6 according to some exemplary embodiments.

Referring to FIGS. 6 to 8, a display device 10 according to some exemplary embodiments includes a cover window 100, a touch sensing unit 200, a display panel 300, a panel lower member 330, and a middle frame 600. A lower cover (e.g., lower cover 900 in FIG. 2) may be further disposed under the middle frame 600. The display panel 300 and the cover window 100 are attached and fixed by the first adhesive layer 810, the display panel 300 and the touch sensing unit 200 are attached and fixed by the second adhesive layer 820, and the display panel 300 and the panel lower member 330 are attached and fixed by the third adhesive layer 830. In some exemplary embodiments, the panel lower member 330 may be supported by the middle frame 600 disposed thereunder, and the first waterproofing member 410 may be disposed between the middle frame 600 and the panel lower member 330. For example, in the display device 10, the first waterproofing member 410 may be disposed between the middle frame 600 and the panel lower member 330 in correspondence to the second area DR2, which is a curved area. The first waterproofing member 410 may be disposed over the entire (or substantially the entire) second area DR2 between the middle frame 600 and the panel lower member 330, and may also be disposed only in a part of the second area DR2 between the middle frame 600 and the panel lower member 330. An accommodating groove SH is disposed in the second area DR2 of the middle frame 600 of some exemplary embodiments. As described, the accommodating grooves SH may be disposed at the left and right edges of the second area DR2, respectively. For example, the first accommodating groove SH1 may be disposed along the second long side LS2 at the left edge of the second area DR2, and the second accommodating groove SH2 may be disposed along the first long side LS1 at the right edge of the second area DR2.

The area corresponding to sectional line A-A' in FIG. 1 corresponds to the left edge area. Hereinafter, a description will be made with reference to this portion of the display device 10. Unless otherwise noted, the right edge area on a similar sectional line as the sectional line A-A' has substantially the same structure as the left edge area, except for a concave portion (e.g., first and second concave portions NHT1 and NHT2) having a notch shape.

The first pressure sensor 510, the first accommodating groove cover MC1, and the first waterproofing member 410 are disposed over the first accommodating groove SH1 disposed in the second area DR2 of the middle frame 600. The first area DR1 of the middle frame 600 may include a flat bottom surface BS and a flat top surface TS. The second area DR2 of the middle frame 600 may include a flat first surface a1 extending from the flat bottom surface BS of the first area DR1 to the second area DR2 and a curved second surface a2 connected to the end of the first surface a1. The second surface a2 may be provided with the first accommodating groove SH1. The first accommodating groove SH1 may include a fourth surface a4 on which the first pressure sensor 510 is placed and third and fifth surfaces a3 and a5 that are side surfaces connecting the fourth surface a4 and the second surface a2 of the middle frame 600. In some exemplary embodiments, the fourth surface a4 of the first accommodating groove SH1 may be a curved surface having a constant curvature. For example, the fourth surface a4 of the first accommodating groove SH1 may be a curved surface having the same curvature as the second surface a2 of the middle frame 600. However, exemplary embodiments are not limited thereto, and the fourth surface a4 of the first accommodating groove SH1 may be a flat surface. When the first accommodating groove SH1 is composed of a flat surface, there is an advantage that the first pressure sensor 510 may be more easily mounted in the first accommodating groove SH1. A cross-section of the first accommodating groove SH1 may have various shapes that can mount the first pressure sensor 510.

A first adhesive member CP1 is disposed on the lower surface of the first pressure sensor 510 placed on the fourth surface a4 of the first accommodating groove SH1 so as to attach and fix the first pressure sensor 510 to the fourth surface a4 of the first accommodating groove SH1. A pressure concentration bump 530 may be disposed on the upper surface of the first pressure sensor 510. The width of the pressure concentration bump 530 may be narrower than the width of the first pressure sensor 510, but exemplary embodiments are not limited thereto. The pressure concentration bump 530 may concentrate a pressure caused by an external force in a pressure sensing layer in each sensing area without dispersing the pressure. Accordingly, the sensitivity of the first pressure sensor 510 can be improved. The cross-section of the pressure concentration bump 530 may have a rectangular shape, but exemplary embodiments are not limited thereto, and the cross-section of the pressure concentration bump 530 may have various shapes, such as a hemispherical shape, a polygonal shape other than the rectangular shape, and the like. A first accommodating groove cover MC1 may be disposed on the pressure concentration bump 530. A second adhesive member CP2 may be disposed on the lower surface of the first accommodating groove cover MC1 to attach and fix the first accommodating groove cover MC1 to the pressure concentration bump 530. The first accommodating groove cover MC1 may be made of the same material as the middle frame 600, but exemplary embodiments are not limited thereto. The first accommodating groove cover MC1 has a constant curvature, and may cover the first accommodating groove SH1. For example, the first accommodating groove cover MC1 may have the same curvature as the second surface a2 of the middle frame 600, and may cover the first accommodating groove SH1. Thus, the second area DR2 of the middle frame 600 is connected to the second surface a2 of the middle frame 600 and the first accommodating groove cover MC1 to form a curved surface having no step. However, exemplary embodiments are not limited thereto, and the first accommodating groove cover MC1 may protrude or be recessed from the second surface a2 of the middle frame 600.

The first waterproofing member 410 may be disposed in the second area DR2 of the middle frame 600 including the first accommodating groove cover MC1. The first waterproofing member 410 may include a base film 411, a first adhesive layer 412 disposed on one surface of the base film 411, and a second adhesive layer 413 disposed on the other surface of the base film 411. The base film 411 may be at least one of a polyethylene terephthalate (PET) film, a cushion layer, or a polyethylene foam (PE-foam). The first adhesive layer 412 and the second adhesive layer 413 may be pressure-sensitive adhesive layers, but exemplary embodiments are not limited thereto. The first waterproofing member 410 may cover the entire surface of the second area DR2 of the middle frame 600 including the first accommodating groove cover MC1, but exemplary embodiments are not limited thereto. For instance, the first waterproofing member 410 may cover a part of the second area DR2 of the middle frame 600. The first waterproofing member 410 of some exemplary embodiments may extend to cover the first surface a1, which is the lower surface of the middle frame 600, and may also extend to cover a part of the first area DR1 of the middle frame 600. Further, in some exemplary embodiments, the first waterproofing member 410 may be disposed on the first pressure sensor 510 and the pressure concentration bump 530 by omitting the first accommodating cover MC1.

Figure 9:
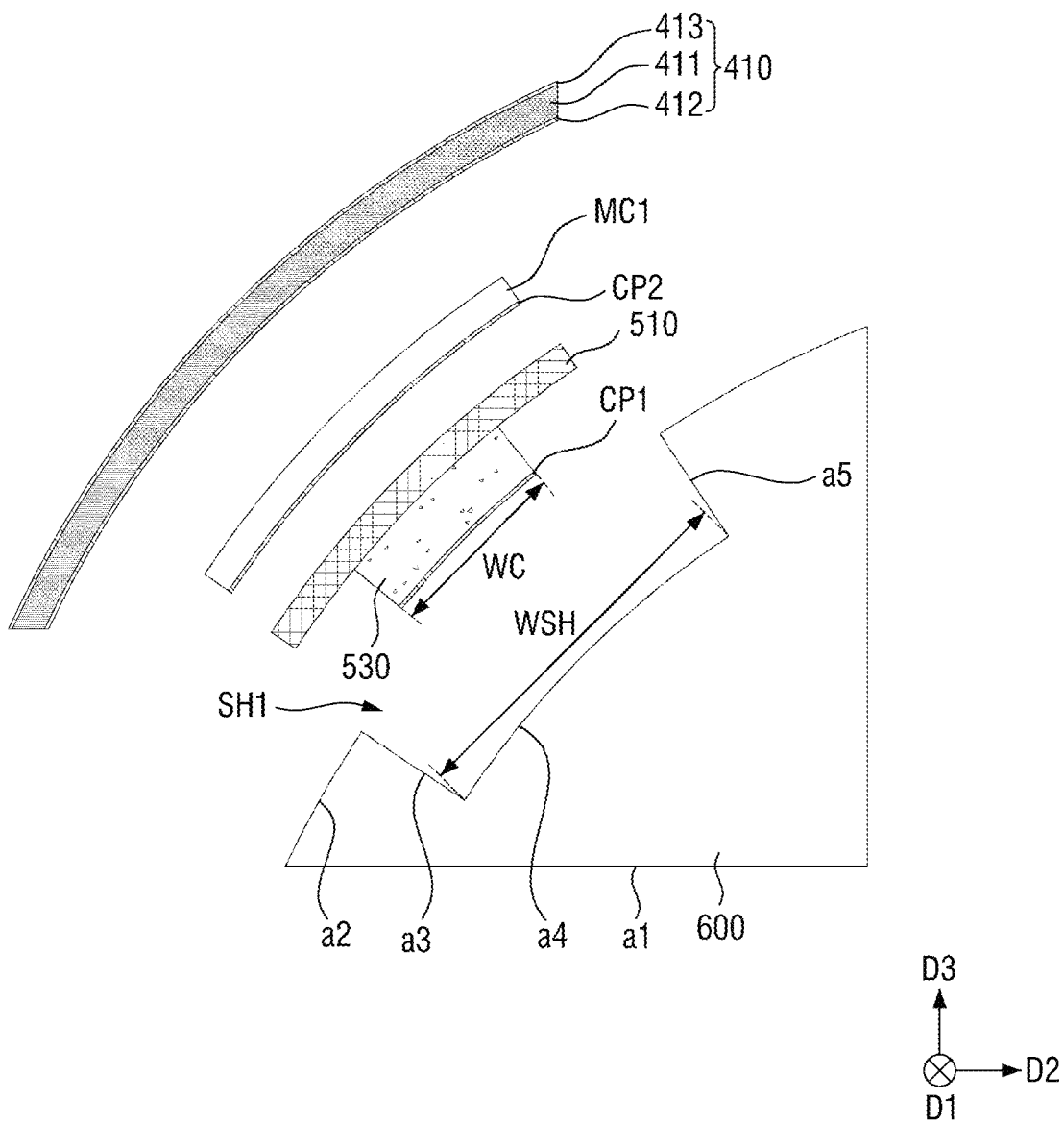
FIG. 9 is an exploded cross-sectional view of a second area of a middle frame according to some exemplary embodiments.
Figure 10:
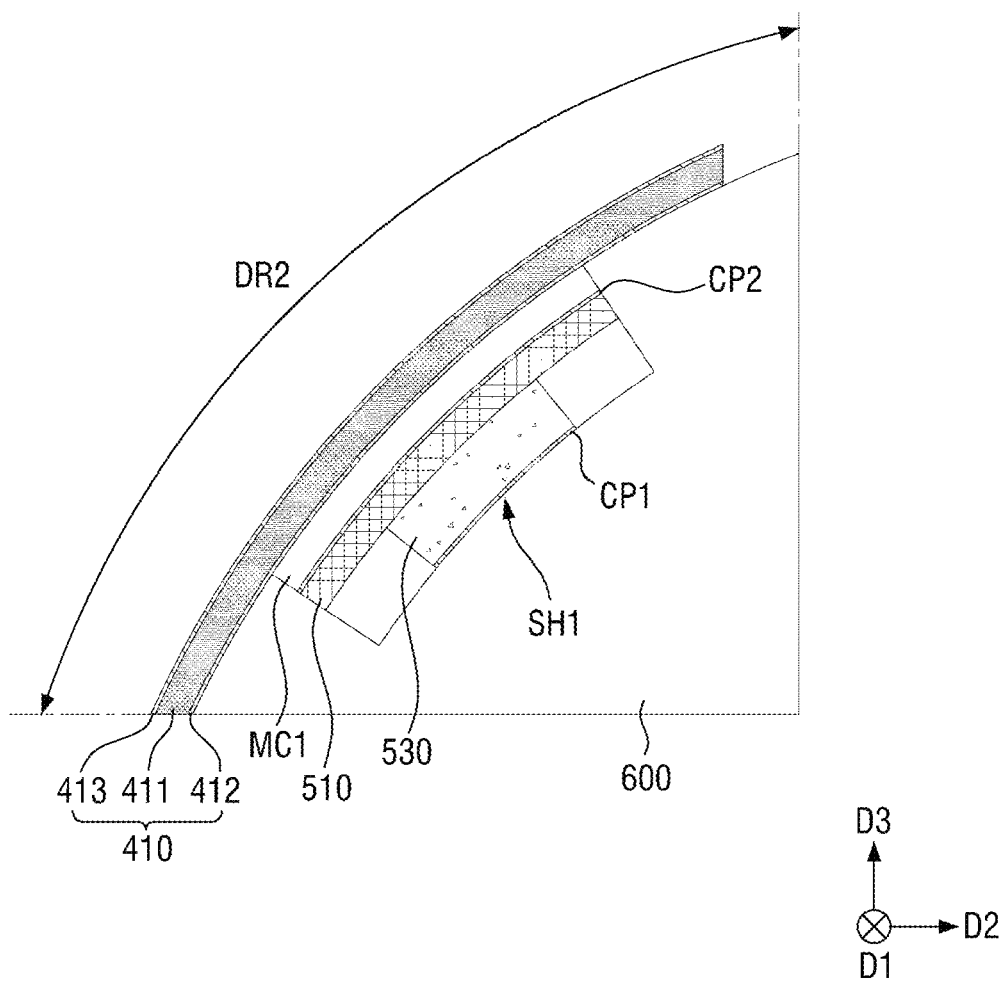
FIG. 10 is an enlarged view of a second area of a middle frame according to some exemplary embodiments.

FIG. 9 is an exploded cross-sectional view of a second area of a middle frame according to some exemplary embodiments. FIG. 10 is an enlarged view of a second area of a middle frame according to some exemplary embodiments.

Referring to FIGS. 9 and 10, the pressure concentration bump 530 may be disposed on the lower surface of the first pressure sensor 510 and placed on the fourth surface a4 of the first accommodating groove SH1 of the middle frame 600. The first adhesive member CP1 may be disposed on the lower surface of the pressure concentration bump 530 to attach and fix the pressure concentration bump 530 and the first pressure sensor 510 disposed on the pressure concentration bump 530 to the fourth surface a4 of the first accommodating groove SH1. The width WC of the pressure concentration bump 530 may be smaller than the width WSH of the first accommodating groove SH1, and in this case, one side surface of the pressure concentration bump 530 and the third surface a3 of the first accommodating groove SH1 may be spaced apart from the other side surface of the pressure concentration bump 530 and the fifth surface a5 of the first accommodating groove SH1. The first accommodating groove cover MC1 may be disposed on the upper surface of the first pressure sensor 510. The second adhesive member CP2 may be disposed on the lower surface of the first accommodating groove cover MC1 to attach and fix the first accommodating groove cover MC1 to the upper surface of the first pressure sensor 510. Since the pressure concentration bump 530 is disposed on the lower surface of the first pressure sensor 510, the attached area of the first accommodating groove cover MC1 and the first pressure sensor 510 increases, and thus, the first accommodating groove cover MC1 and the first pressure sensor 510 can be stably fixed.

Figure 11:
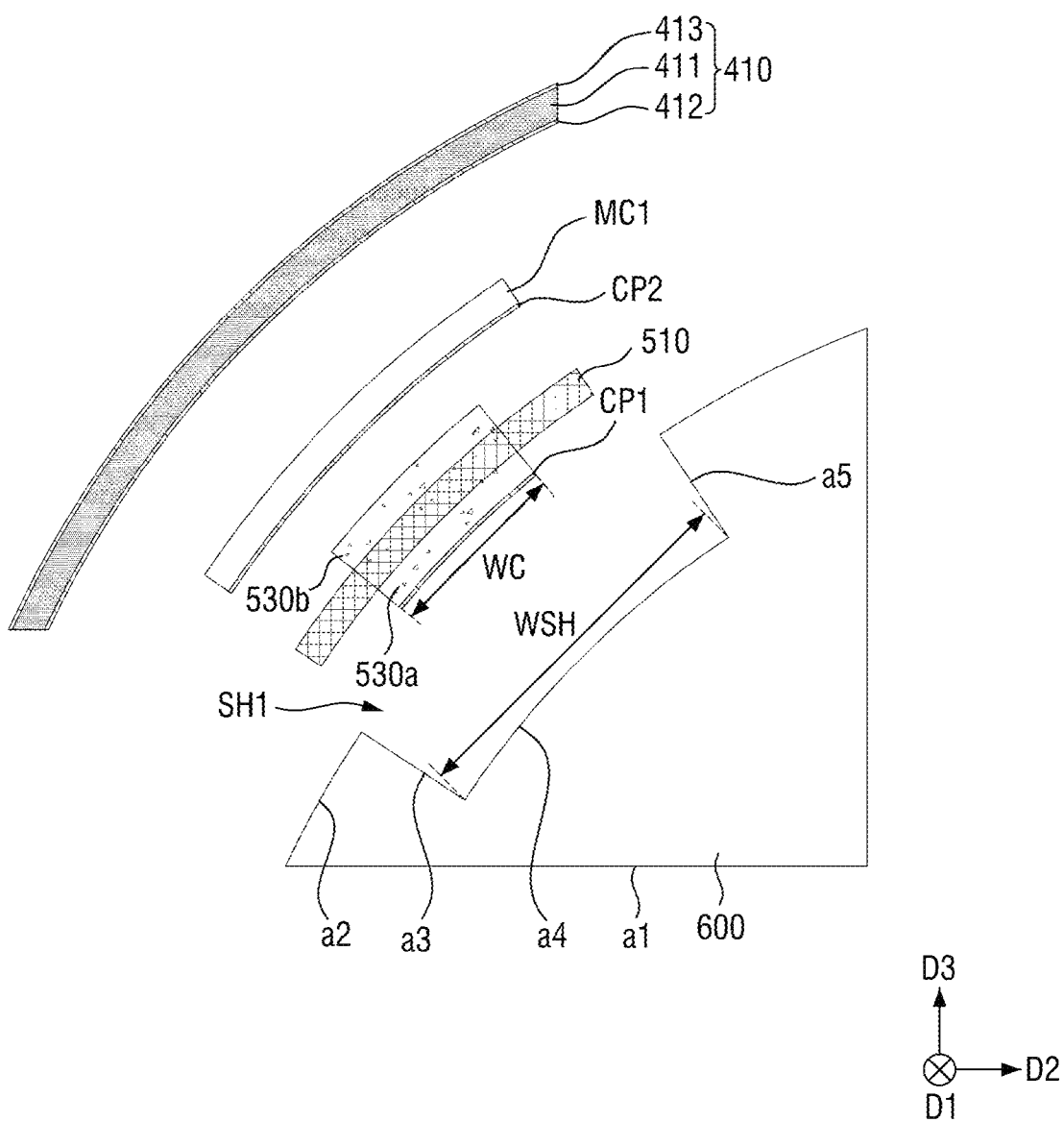
FIG. 11 is an exploded cross-sectional view of a second area of a middle frame according to some exemplary embodiments.
Figure 12:
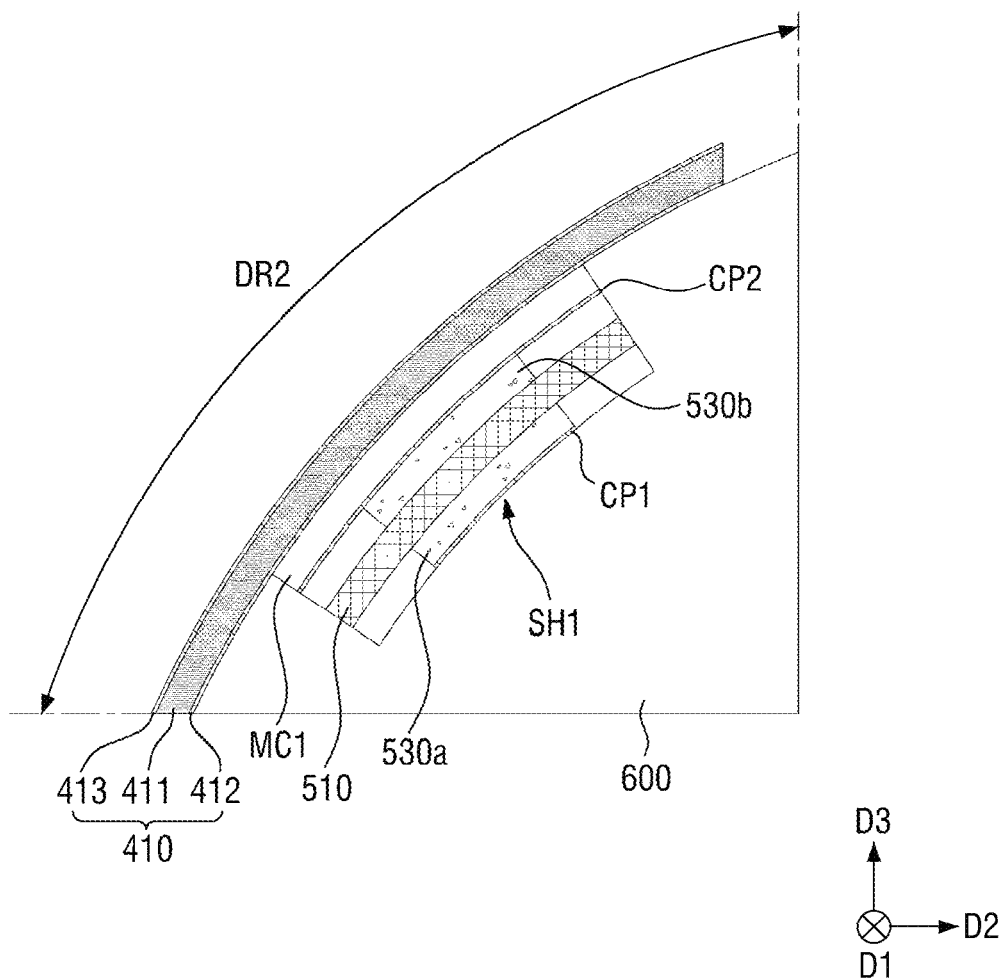
FIG. 12 is an enlarged view of a second area of a middle frame according to some exemplary embodiments.

FIG. 11 is an exploded cross-sectional view of a second area of a middle frame according to some exemplary embodiments. FIG. 12 is an enlarged view of a second area of a middle frame according to some exemplary embodiments.

Referring to FIGS. 11 and 12, in the middle frame 600 of another exemplary embodiment, a first pressure concentration bump 530*a* may be disposed on the lower surface of the first pressure sensor 510 placed on the fourth surface a4 of the first accommodating groove SH1, and a second pressure concentration bump 530*b* may be disposed on the upper surface of the first pressure sensor 510 attached to the first accommodating groove cover MC1. The widths WC of the first pressure concentration bump 530*a* and the second pressure concentration bump 530*b* may be equal to each other, and the width WC of each of the first pressure concentration bump 530*a* and the second pressure concentration bump 530*b* may be narrower than the width of the first pressure sensor 510, but exemplary embodiments are not limited thereto. For example, the first pressure concentration bump 530*a* and the second pressure concentration bump 530*b* may have different widths WC from each other, and any one of the first pressure concentration bump 530*a* and the second pressure concentration bump 530*b* may have the same width WC as the first pressure sensor 510 and the other one thereof may have a narrower width WC than the first pressure sensor 510.

The first adhesive member CP1 may be disposed on the lower surface of the first pressure concentration bump 530*a* to attach and fix the first pressure concentration bump 530*a* and the first pressure sensor 510 disposed on the first pressure concentration bump 530*a* to the fourth surface a4 of the first accommodating groove SH1. The second adhesive member CP2 may be disposed on the lower surface of the first accommodating groove cover MC1 to attach and fix the first accommodating groove cover MC1 to the second pressure concentration bump 530*b*. As such, since the first pressure concentration bump 530*a* is disposed on the lower surface of the first pressure sensor 510 and the second pressure concentration bump 530*b* is disposed on the upper surface of the first pressure sensor 510, the pressure due to the external force can be further concentrated on the pressure sensing layer in each sensing area, and thus, the sensitivity of the first pressure sensor 510 can be further improved. The width WC of each of the first pressure concentration bump 530*a* and the second pressure concentration bump 530*b* in some exemplary embodiments may be smaller than the width WSH of the first accommodating groove SH1, and in this case, one side surface of each of the first pressure concentration bump 530*a* and the second pressure concentration bump 530*b* and the third surface a3 of the first accommodating groove SH1 may be spaced apart from the other side surface of each of the first pressure concentration bump 530*a* and the second pressure concentration bump 530*b* and the fifth surface a5 of the first accommodating groove SH1.

Figure 13:
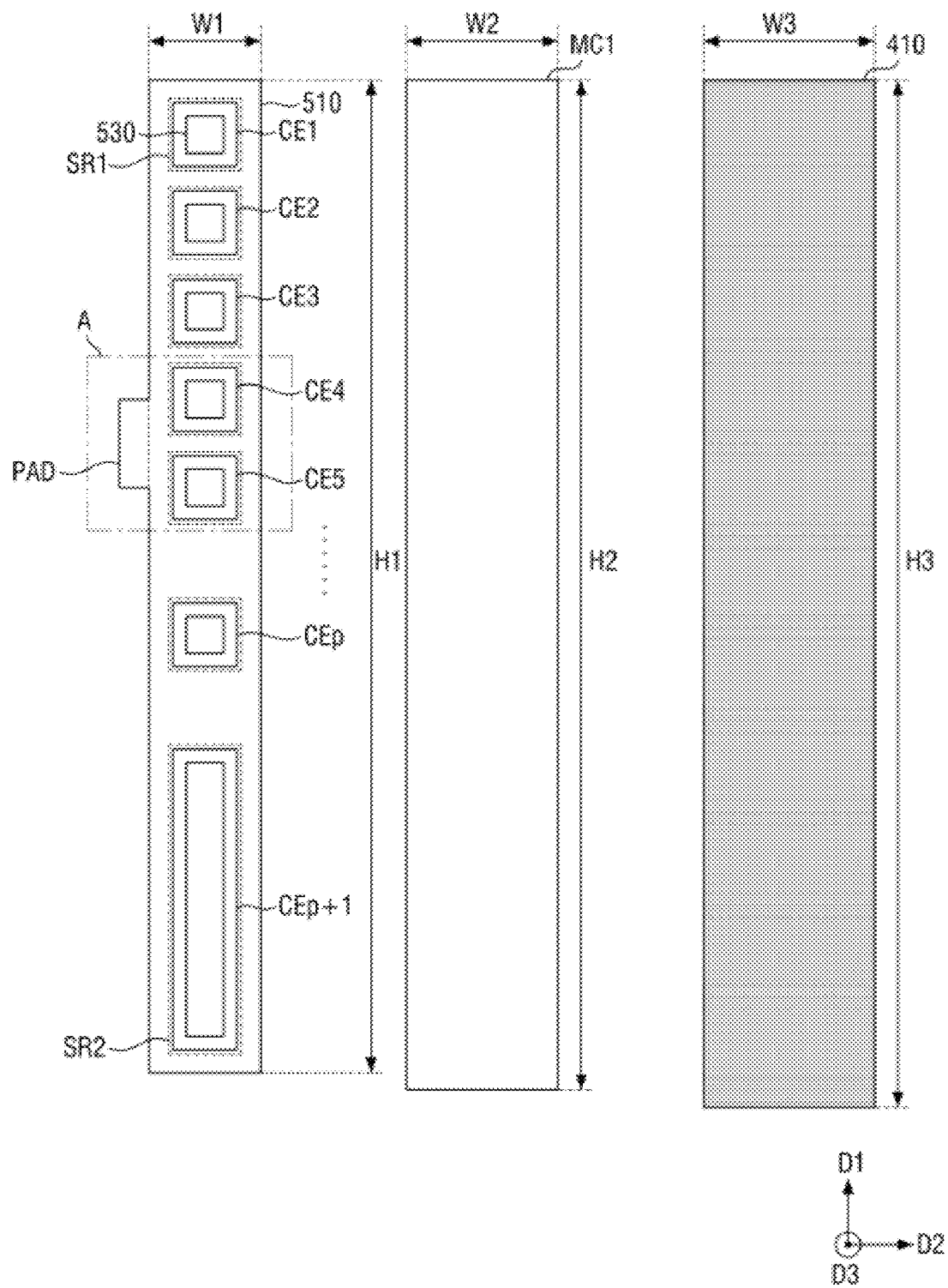
FIG. 13 is a plan view showing a first pressure sensor, a first accommodating groove cover, and a first waterproofing member according to some exemplary embodiments.

FIG. 13 is a plan view showing a first pressure sensor, a first accommodating groove cover, and a first waterproofing member according to some exemplary embodiments.

Referring to FIG. 13, the first pressure sensor 510 mounted in the first accommodating groove SH1 may have a rectangular planar shape having long sides in the first direction D1 and short sides in the second direction D2. However, the planar shape of the first pressure sensor 510 is not limited thereto, and may vary depending on the applied position. The first pressure sensor 510 includes a plurality of pressure sensing cells CE1 to CEp and CEp+1. Although it is illustrated in FIG. 13 that the first pressure sensor 510 includes seven pressure sensing cells CE1 to CEp and CEp+1, the number of the pressure sensing cells is not limited thereto.

Each of the pressure sensing cells CE1 to CEp and CEp+1 may independently sense pressure at its corresponding position. Although it is illustrated in FIG. 13 that the pressure sensing cells CE1 to CEp and CEp+1 are arranged in one row, exemplary embodiments are not limited thereto. The pressure sensing cells CE1 to CEp and CEp+1 may be arranged in a plurality of rows. The respective pressure sensing cells CE1 to CEp and CEp+1 may be arranged to be spaced apart from each other at predetermined intervals as shown in FIG. 13, or may be arranged continuously or variably.

Areas where pressure is sensed by the pressure sensing cells CE1 and CEp+1 are defined as first and second sensing areas SR1 and SR2. For example, an area where pressure is sensed by the first pressure sensing cell CE1 disposed at the upper end side of the first pressure sensor 510 is defined as a first sensing area SR1, and an area where pressure is sensed by the second pressure sensing cell CEp+1 disposed at the lower end side of the first pressure sensor 510 is defined as a second sensing area SR2.

The plurality of sensing areas SR1 and SR2 may have different areas depending on the application to be used. For example, the first sensing area SR1 may be used as a physical button, such as a volume control button VB+ or VB− or a power button PB disposed on a side surface of the display device 10. The second sensing area SR2 may be used as a button SQB for sensing the squeezing pressure of a user. In this case, the second sensing area SR2 may be formed to have a larger area than the first sensing area SR1. The second sensing area SR2 may be formed to be longer than the first sensing area SR1 in the first direction D 1 of the first pressure sensor 510.

Further, although it is illustrated in FIG. 13 that the plurality of first sensing areas SR1 used as physical buttons are formed to have the same area, exemplary embodiments are not limited thereto. That is, the areas of the plurality of first sensing areas SR1 may be different from each other, or the areas of some of the plurality of first sensing areas SR1 may be equal to each other and the areas of the others of the plurality of first sensing areas SR1 may be equal to each other, but the area of each of some of the first sensing areas SR1 and the area of each of the others of the first sensing areas SR1 may be different from each other. The pressure concentration bumps 530 may be disposed on the plurality of pressure sensing cells CE1 to CEp and CEp+1 to overlap the plurality of pressure sensing cells CE1 to CEp and CEp+1. The pressure concentration bumps 530 serves to press the plurality of pressure sensing cells CE1 to CEp and CEp+1 according to the pressure of the user when the pressure of the user is applied. Each of the pressure concentration bumps 530 may be formed to have a smaller area than each of the plurality of pressure sensing cells CE1 to CEp and CEp+1. The area of the pressure concentration bump 530 may be proportional to the area of the pressure sensing cell. For example, as shown in FIG. 13, when the area of the second pressure sensing cell CEp+1 is larger than the area of each of the first pressure sensing cells CE1, the area of the pressure concentration bump 530 overlapping the second pressure sensing cell CEp+1 may be larger than the area of each of the pressure concentration bump 530 overlapping the first pressure sensing cell CE1.

The first accommodating groove cover MC1 is disposed on the first pressure sensor 510, and may have a rectangular planar shape having long sides in the first direction D1 and short sides in the second direction D2. However, the planar shape of the first accommodating groove cover MC1 is not limited thereto, and may vary depending on the shape and size of the first accommodating groove SH1. The first accommodating groove cover MC1 may have a larger area than the first pressure sensor 510. In some exemplary embodiments, the first pressure sensor 510 may have a first width W1 in the second direction D2 and a first height H1 in the first direction D1. The first accommodating groove cover MC1 may have a second width W2 greater than the first width W1 in the second direction D2, and may have a second height H2 greater than the first height H1 in the first direction D1. However, exemplary embodiments are not limited thereto. The first accommodating groove cover MC1 covers the upper portion of the first pressure sensor 510 in a state in which the first pressure sensor 510 is mounted in the first accommodating groove SH1 of the middle frame 600. To prevent moisture or dust from penetrating between the display panel 300 and the first pressure sensor 510, the first waterproofing member 410 may be attached to the upper surface of the first accommodating groove cover MC1, and in this case, the area of the first waterproofing member 410 may be larger than the area of the first accommodating groove cover MC1. For example, the first waterproofing member 410 may have a third width W3 greater than the second width W2 in the second direction D2, and may have a third height H3 greater than the second height H2 in the first direction D1. However, exemplary embodiments are not limited thereto.

Figure 14:
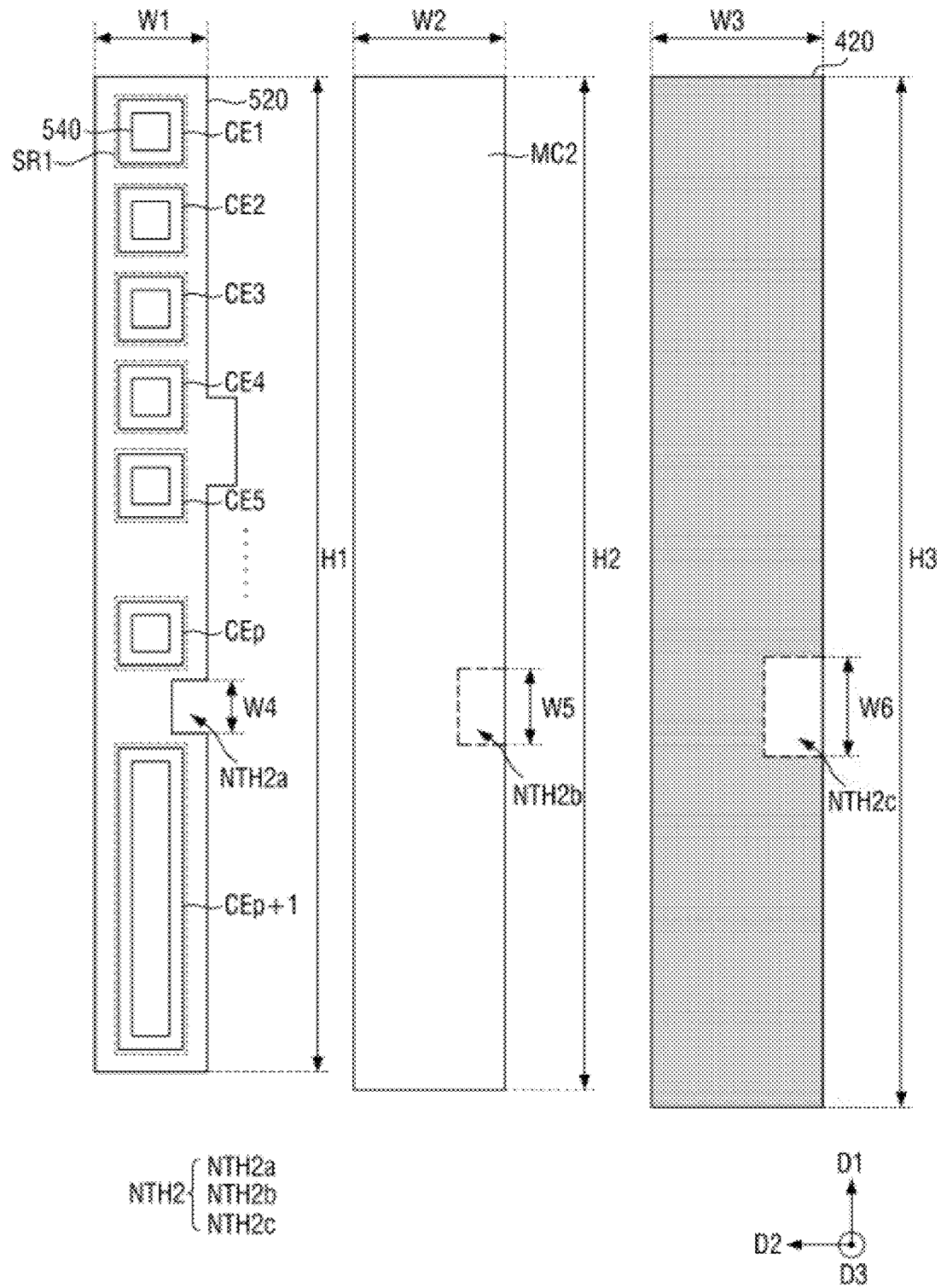
FIG. 14 is a plan view showing a second pressure sensor, a second accommodating groove cover, and a second waterproofing member according to some exemplary embodiments.

FIG. 14 is a plan view showing a second pressure sensor, a second accommodating groove cover, and a second waterproofing member according to some exemplary embodiments. The second pressure sensor 520, the second pressure concentration bump 540, and the second waterproofing member 420, shown in FIG. 14, are different from the first pressure sensor 510, the first pressure concentration bump 530, and the first waterproofing member 410, shown in FIG. 13, in that each of the second pressure sensor 520, the second pressure concentration bump 540, and the second waterproofing member 420 is provided with a second concave portion NTH2. Hereinafter, a redundant description will omitted, and differences will be mainly described.

Referring to FIG. 14, in order not to cover the cable hole CAH of the middle frame 600, corresponding to the first concave portion NTH1 of the second accommodating groove SH2, each of the second pressure sensor 520, the second accommodating groove cover MC2, and the second waterproofing member 420 is provided with a second concave portion NTH2. For instance, a second concave portion NTH2a having a notch shape of the second pressure sensor 520 may be formed in an area corresponding to the first concave portion NTH1 of the second accommodating groove SH2, a second concave portion NTH2b having a notch shape of the second accommodating groove cover MC2 may be formed in an area corresponding to the first concave portion NTH1 of the second accommodating groove SH2, and a second concave portion NTH2c having a notch shape of the second waterproofing member 420 may be formed in an area corresponding to the first concave portion NTH1 of the second accommodating groove SH2. Since the second concave portions NTH2 do not cover the first concave portion NTH1, considering processing errors, the width of the second concave portions NTH2 in the first direction may be larger than the width of the first concave portion NTH1 in the first direction D1. However, exemplary embodiments are not limited thereto, and the first concave portion NTH1 and the second concave portions NTH2 may have the same width.

In some exemplary embodiments, the widths of the second concave portions NTH2 respectively disposed in the second pressure sensor 520, the second accommodating groove cover MC2, and the second waterproofing member 420, in the first direction D1, may be different from each other. For example, the second concave portion NTH2a of the second pressure sensor 520 may have a fourth width W4 in the first direction D1, the second concave portion NTH2b of the second accommodating groove cover MC2 may have a fifth width W5 greater than the fourth width W4 in the first direction D1, and the second concave portion NTH2c of the second waterproofing member 420 may have a sixth width W6 greater than the fifth width W5 in the first direction D1. However, exemplary embodiments are not limited thereto. The widths of the second concave portions NTH2 respectively disposed in the second pressure sensor 520, the second accommodating groove cover MC2, and the second waterproofing member 420 may be equal to each other, or two of the second concave portions NTH2 respectively disposed in the second pressure sensor 520, the second accommodating groove cover MC2, and the second waterproofing member 420 may have the same width, and the other one of the second pressure sensor 520, the second accommodating groove cover MC2, and the second waterproofing member 420 may have a different width.

Further, the second concave portions NTH2 respectively disposed in the second pressure sensor 520, the second accommodating groove cover MC2, and the second waterproofing member 420 may have different areas from each other. For example, considering processing errors, the area of the second concave portion NTH2b of the second accommodating groove cover MC2 may be greater than the area of the second concave portion NTH2a of the second pressure sensor 520, and the area of the second concave portion NTH2c of the second waterproofing member 420 may be greater than the area of the second concave portion NTH2b of the second accommodating groove cover MC2. Exemplary embodiments are not limited thereto. The areas of the second concave portions NTH2a, NTH2b, and NTH2c respectively disposed in the second pressure sensor 520, the second accommodating groove cover MC2, and the second waterproofing member 420 may be equal to each other, and the area of the first concave portion NTH1 formed in the second accommodating groove SH2 may be equal to each of the areas of the second concave portions NTH2a, NTH2b, and NTH2c respectively disposed in the second pressure sensor 520, the second accommodating groove cover MC2, and the second waterproofing member 420.

Figure 15:
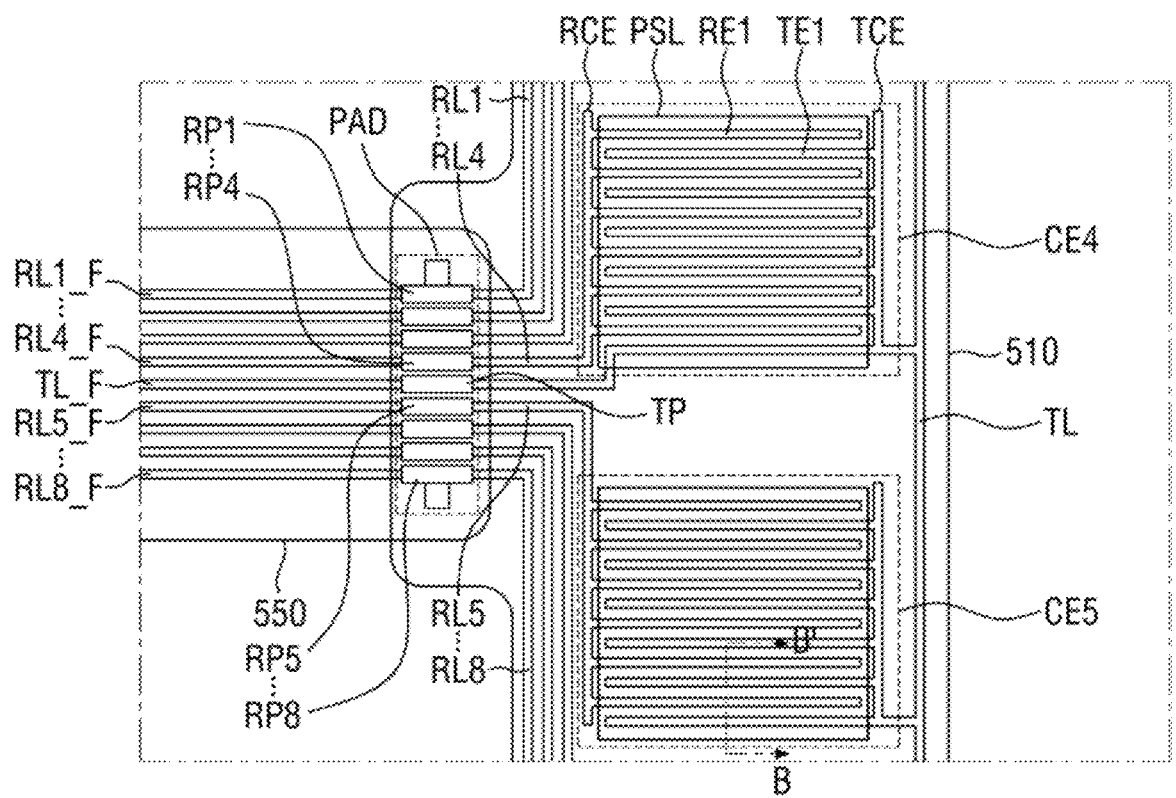
FIG. 15 is a plan view showing the area A of FIG. 13 according to some exemplary embodiments.
Figure 16:
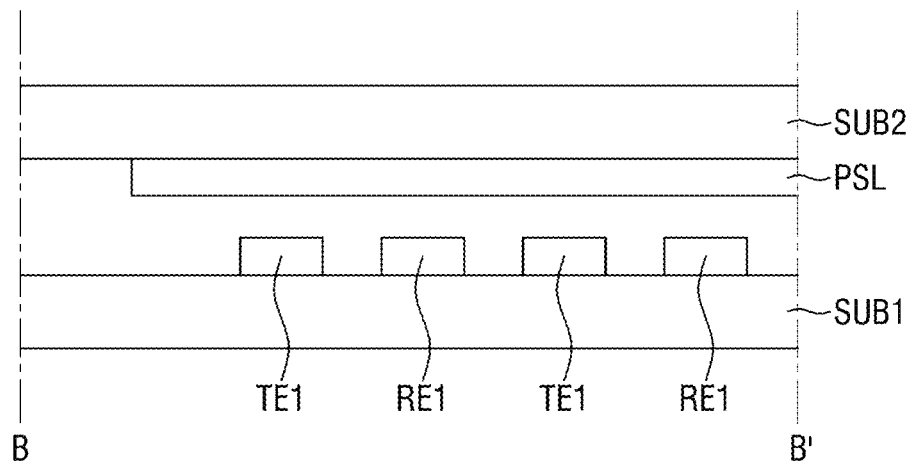
FIG. 16 is a cross-sectional view taken along sectional line B-B' of FIG. 15 according to some exemplary embodiments.
Figure 16:
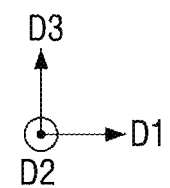

FIG. 15 is a plan view showing the area A of FIG. 13 according to some exemplary embodiments. FIG. 16 is a cross-sectional view taken along sectional line B-B' of FIG. 15 according to some exemplary embodiments.

Referring to FIGS. 15 and 16, the first pressure sensor 510 includes a first substrate SUB1, a second substrate SUB2, a driving line TL, first to eighth sensing lines RL1 to RL8, a driving pad TP, first to eighth sensing pads RP1 to RP8, and first to eighth pressure sensing cells CE1 to CE8. For convenience of explanation, FIG. 15 shows a fourth pressure sensing cell CE4, a fifth pressure sensing cell CE5, and a pad region PAD.

The first substrate SUB1 and the second substrate SUB2 are disposed to face each other. Each of the first substrate SUB1 and the second substrate SUB2 may include at least one of polyethylene, polyimide, polycarbonate, polysulfone, polyacrylate, polystyrene, polyvinyl chloride, polyvinyl alcohol, polynorbornene, and polyester. In some exemplary embodiments, each of the first substrate SUB1 and the second substrate SUB2 may be formed of a polyethylene terephthalate (PET) film or a polyimide film.

The first to eighth pressure sensing cells CE1 to CE8 are arranged between the first substrate SUB1 and the second substrate SUB2. The driving line TL, the first to eighth sensing lines RL1 to RL8, the driving pad TP, and the first to eighth sensing pads RP1 to RP8 are arranged on the first substrate SUB1 facing the second substrate SUB2. Each of the first to eighth pressure sensing cells CE1 to CE8 may be connected to at least one driving line and at least one sensing line. For example, the first to eighth pressure sensing cells CE1 to CE8 may be commonly connected to one driving line TL, whereas the first to eighth pressure sensing cells CE1 to CE8 may be connected one-to-one to the first to eighth sensing lines RL1 to RL8. As shown in FIG. 8, the fourth pressure sensing cell CE4 may be connected to the driving line TL and the fourth sensing line RL4, and the fifth pressure sensing cell CE5 may be connected to the driving line TL and the fifth sensing line RL5.

The driving line TL may be connected to the driving pad TP, and the first to eighth sensing lines RL1 to RL8 may be connected one-to-one to the first to eighth sensing pads RP1 to RP8. The first sensing line RL1 may be connected to the first sensing pad RP1, the second sensing line RL2 may be connected to the second sensing pad RP2, the third sensing line RL3 may be connected to the third sensing pad RP3, and the fourth sensing line RL4 may be connected to fourth sensing pad RP4. The fifth sensing line RL5 may be connected to the fifth sensing pad RP5, the sixth sensing line RL6 may be connected to the sixth sensing pad RP6, the seventh sensing line RL7 may be connected to the seventh sensing pad RP7, and the eight sensing line RL8 may be connected to the eight sensing pad RP8.

The pad region PAD may protrude from one side of the first substrate SUB1. One side of the first substrate SUB1 may be the long side of the first pressure sensor 510. Although it is illustrated in FIG. 15 that the pad region PAD protrudes from a central portion of the long side of the first substrate SUB1, but exemplary embodiments are not limited hereto. That is, the pad region PAD may protrude from one end or the other end of the long side of the first substrate SUB1. The driving pad TP and the first to eighth sensing pads RP1 to RP8 may be disposed in the pad region PAD.

The driving pad TP and the first to eighth sensing pads RP1 to RP8 may be connected one-to-one to the driving lead line TL_F and first to eighth sensing lead lines RL1_F to RL8_F of the pressure sensing circuit board 550 through an anisotropic conductive film. The driving pad TP may be connected to the driving lead line TL_F, the first sensing pad RP1 may be connected to the first sensing lead line RL1_F, the second sensing pad RP2 may be connected to the second sensing lead line RL2_F, the third sensing pad RP3 may be connected to the third sensing lead line RL3_F, and the fourth sensing pad RP4 may be connected to the fourth sensing lead line RL2_F. Further, the fifth sensing pad RP5 may be connected to the fifth sensing lead line RL5_F, the sixth sensing pad RP6 may be connected to the sixth sensing lead line RL6_F, the seventh sensing pad RP7 may be connected to the seventh sensing lead line RL7_F, and the eighth sensing pad RP8 may be connected to the eighth sensing lead line RL8_F.

Since the pressure sensing circuit board 550 is connected to the display circuit board 310 as shown in FIG. 3, the pressure sensing circuit board 550 may be electrically connected to the pressure sensing unit 322 mounted on the display circuit board 310. The pressure sensing unit 322 applies a driving voltage to the driving line TL through the driving lead line TL_F of the pressure sensing circuit board 550 and the driving pad TP of the first pressure sensor 510, and senses current values or voltage values from the first to eighth sensing lines RL1 to RL8 through the first to eighth sensing lead lines RL1_F to RL8_F connected to the first to eighth sensing pads RP1 to RP8 of the first pressure sensor 510, thereby sensing the pressure applied to at least one of the first to eighth pressure sensing cells CE1 to CE8.

Although not shown, the first pressure sensor 510 may further include a bonding layer disposed between the first substrate SUB1 and the second substrate SUB2 to bond the first substrate SUB1 and the second substrate SUB2 to each other. The bonding layer may be a pressure-sensitive adhesive layer or an adhesive layer. The bonding layer may be disposed along the periphery of the first substrate SUB1 and the second substrate SUB2. In some exemplary embodiments, the bonding layer may serve to encapsulate the inside of the first pressure sensor 510 by completely surrounding the edges of the first substrate SUB1 and the second substrate SUB2. Moreover, the bonding layer may serve as a spacer that maintains a constant distance between the first substrate SUB1 and the second substrate SUB2. The bonding layer may not overlap the driving line TL, the first to eighth sensing lines RL1 to RL8, the first to eighth pressure sensing cells CE1 to CE8, the driving pad TP, and the first to eighth sensing pads RP1 to RP8.

The bonding layer may be first attached to one surface of the first substrate SUB1 or one surface of the second substrate SUB2, and attached to one surface of the other substrate in a process of attaching the first substrate SUB1 and the second substrate SUB2. As another example, bonding layers may be respectively provided on one surface of the first substrate SUB1 and one surface of the second substrate SUB2, and the bonding layer of the first substrate SUB1 and the bonding layer of the second substrate SUB2 may be attached to each other in a process of attaching the first substrate SUB1 and the second substrate SUB2.

As shown in FIGS. 13 and 15, each of the first to eighth pressure sensing cells CE1 to CE8 includes a driving connection electrode TCE, a sensing connection electrode RCE, driving electrodes TE1, sensing electrodes RE1, and a pressure sensing layer PSL. The driving connection electrode TCE, the sensing connection electrode RCE, the driving electrodes TE1, and the sensing electrodes RE1 may be disposed on the first substrate SUB1 facing the second substrate SUB2. The driving connection electrode TCE is connected to the driving line TL and the driving electrodes TE1. For instance, the driving connection electrode TCE is connected to the driving line TL at one end in the first direction D1. The driving electrodes TE1 may be branched in the second direction D2 of the driving connection electrode TCE. The sensing connection electrode RCE is connected to any one of the first to eighth sensing lines RL1 to RL8 and the sensing electrodes RE1. For instance, the sensing connection electrode TCE is connected to any one of the first to eighth sensing lines RL1 to RL8 at one end in the first direction D1. The sensing electrodes RE1 may be branched in the second direction D2 of the sensing connection electrode RCE.

The driving electrodes TE1 and the sensing electrodes RE1 may be disposed on the same layer. The driving electrodes TE1 and the sensing electrodes RE1 may be made of the same material. For example, the driving electrodes TE1 and the sensing electrodes RE1 may include a conductive material, such as silver (Ag) or copper (Cu). The driving electrodes TE1 and the sensing electrodes RE1 may be formed on the first substrate SUB1 by a screen printing method.

The driving electrodes TE1 and the sensing electrodes RE1 are disposed adjacent to each other, but are not connected to each other. The driving electrodes TE1 and the sensing electrodes RE1 may be arranged in parallel with each other. The driving electrodes TE1 and the sensing electrodes RE1 may be alternately arranged in the length direction (e.g., D1-axis direction) of the driving connection electrode TCE and the sensing connection electrode RCE. That is, the driving electrode TE1, the sensing electrode RE1, the driving electrode TE1, and the sensing electrode RE1 may be repeatedly arranged in this order in the length direction (D1-axis direction) of the driving connection electrode TCE and the sensing connection electrode RCE.

The pressure sensing layer PSL is disposed on one surface of the second substrate SUB2 facing the first substrate SUB1. The pressure sensing layer PSL may be disposed to overlap the driving electrodes TE1 and the sensing electrodes RE1. The pressure sensing layer PSL may include a pressure-sensitive material and a polymer resin in which the pressure-sensitive material is provided. The pressure-sensitive material may include fine metal particles (or metal nanoparticles) of at least one of nickel, aluminum, titanium, tin, and copper. For example, the first pressure sensing layer PSL may be a quantum tunneling composite (QTC).

When pressure is not applied to the second substrate SUB2 in the third direction D3 of the first pressure sensor 510, as shown in FIG. 16, gaps exist between the pressure sensing layer PSL and the driving electrodes TE1 and between the pressure sensing layer PSL and the sensing electrodes RE1. That is, when pressure is not applied to the second substrate SUB2, the pressure sensing layer PSL is spaced apart from the driving electrodes TE1 and the sensing electrodes RE1.

When pressure is applied to the second substrate SUB2 in the third direction D3 of the first pressure sensor 510, the pressure sensing layer PSL may be brought into contact with the driving electrodes TE1 and the sensing electrodes RE1. In this case, at least one of the driving electrode TE1 and at least one of the sensing electrodes RE1 may be physically connected through the pressure sensing layer PSL, and the pressure sensing layer PSL may act as an electrical resistance.

Accordingly, since the contact area of the pressure sensing layer PSL with the driving electrodes TE1 and the sensing electrode RE1 can be changed depending on the pressure applied to the first pressure sensor 510, the resistance value of the sensing line electrically connected to the sensing electrodes RE1 may be changed. The pressure sensing unit 322 of FIG. 3 senses a change in a current value or a voltage value from the first to eighth sensing lines RL1 to RL8, thereby sensing the pressure pressed by, for instance, a user's hand. Meanwhile, since the second pressure sensor 520 is substantially the same as the first pressure sensor 510 shown in FIGS. 15 and 16, a detailed description of the second pressure sensor 520 will be omitted.

Figure 17:
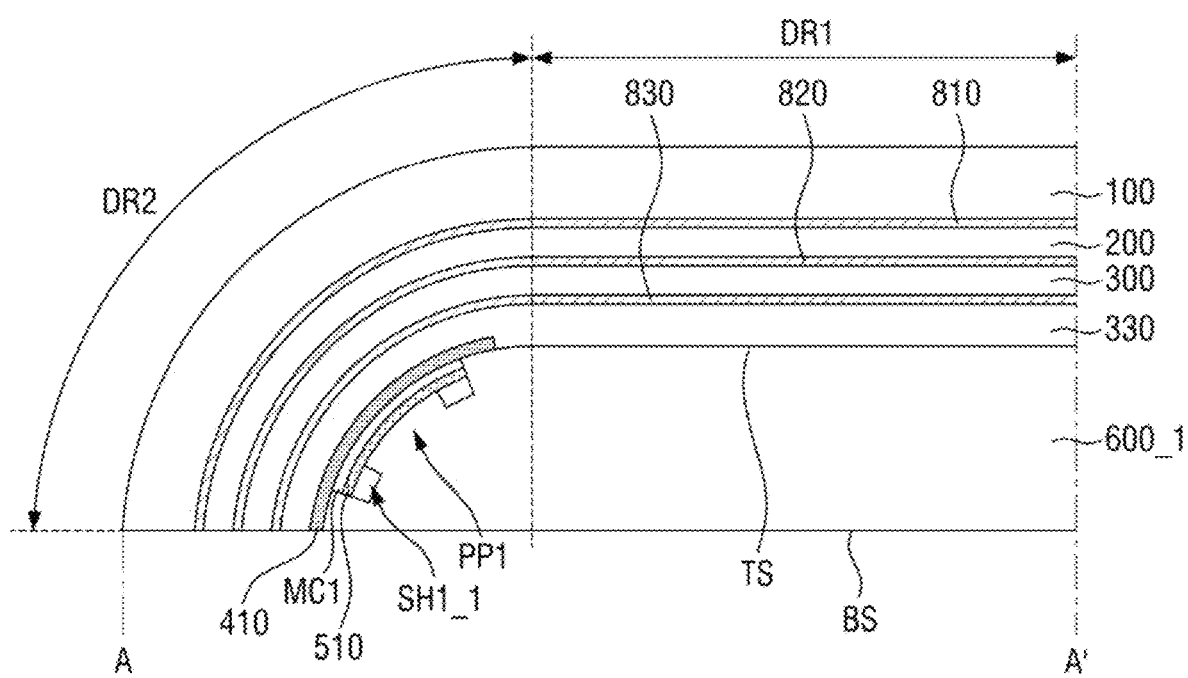
FIG. 17 is a cross-sectional view taken along sectional line A-A' of FIG. 1 according to some exemplary embodiments.
Figure 17:
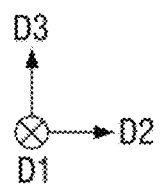
Figure 18:
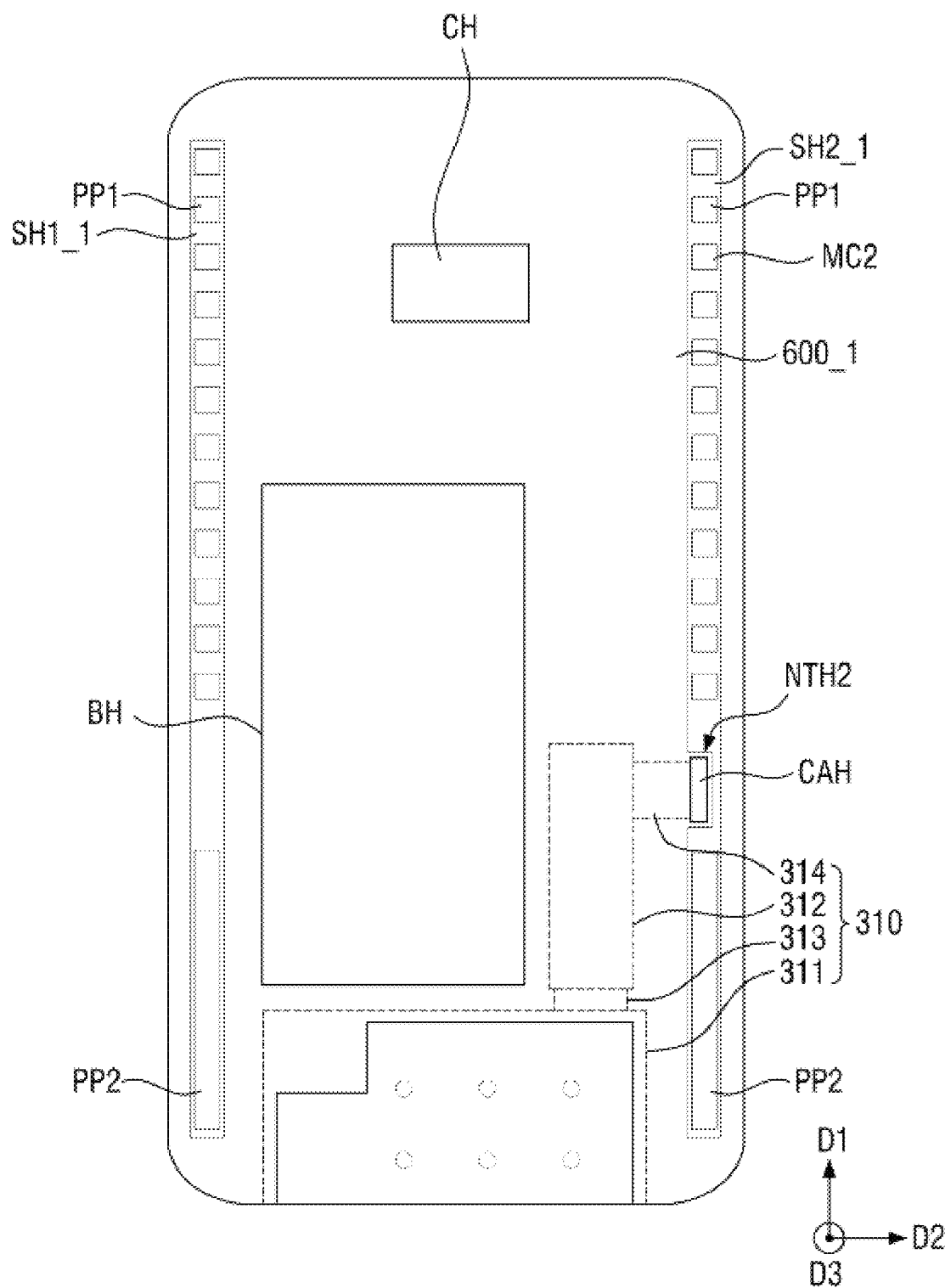
FIG. 18 is a plan view of a middle frame according to some exemplary embodiments.
Figure 19:
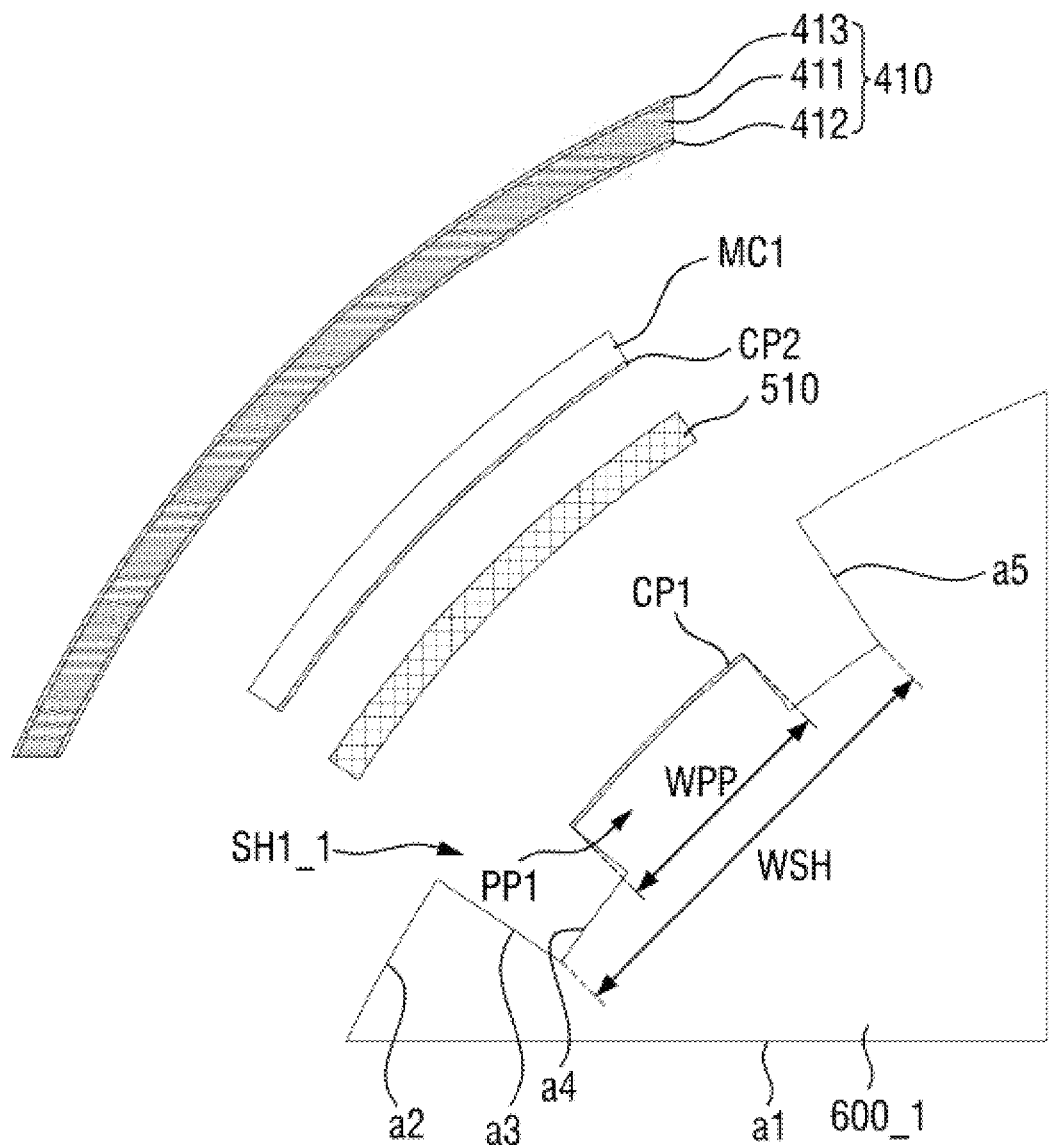
FIG. 19 is an exploded cross-sectional view of the second area of FIG. 17 according to some exemplary embodiments.
Figure 19:
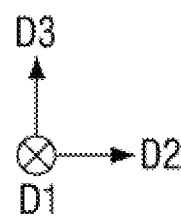
Figure 20:
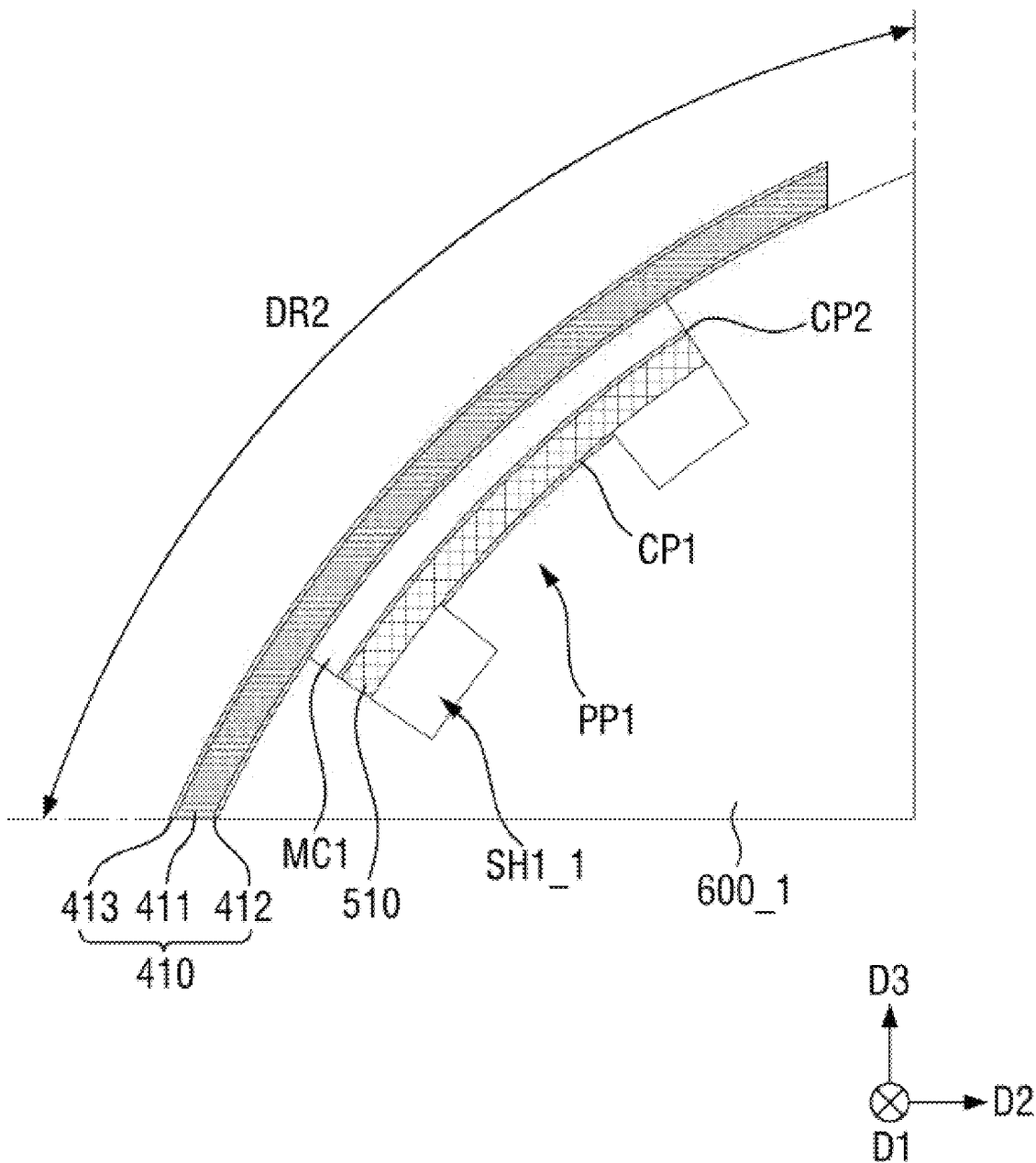
FIG. 20 is an enlarged view of the second area of FIG. 17 according to some exemplary embodiments.

FIG. 17 is a cross-sectional view taken along sectional line A-A' of FIG. 1 according to some exemplary embodiments. FIG. 18 is a plan view of a middle frame according to some exemplary embodiments. FIG. 19 is an exploded cross-sectional view of the second area of FIG. 17 according to some exemplary embodiments. FIG. 20 is an enlarged view of the second area of FIG. 17 according to some exemplary embodiments.

Another exemplary embodiment, which will be described in association with FIGS. 17 to 20, is different from the exemplary embodiment described in association with at least FIG. 6 in that a protrusion PP1 is disposed in the first accommodating groove SH1_1 of the middle frame 600_1. As such, a redundant description will be omitted, and differences will be mainly described.

Referring to FIG. 17, the exemplary embodiment described in association with FIG. 17 is different from the exemplary embodiment described in association with FIG. 6 in that a first protrusion PP1 is disposed in a first accommodating groove SH1_1 disposed in a second area DR2 of a middle frame 600_1, and the first pressure sensor 510 is placed on the upper surface of the first protrusion PP1. When the first protrusion PP1 is described with reference to FIG. 18, the first accommodating groove SH1_1 may be disposed at the left edge of the second area DR2 of the middle frame 600_1, and the second accommodating groove SH2_1 may be disposed at the right edge of the second area DR2 of the middle frame 600_1. The plurality of first protrusions PP1 spaced apart from each other in the first direction D1 may be disposed in each of the first accommodating groove SH1_1 and the second accommodating groove SH2_1.

Although it is illustrated in FIG. 18 that the plurality of first and second protrusions PP1 and PP2 are arranged in one row, exemplary embodiments are not limited thereto. The plurality of first and second protrusions PP1 and PP2 may be arranged in a plurality of rows. Further, the plurality of first and second protrusions PP1 and PP2 may be arranged to be spaced apart from each other at predetermined intervals, or may be arranged continuously, or variably. The plurality of first and second protrusions PP1 and PP2 may include a plurality of first protrusions PP1 arranged on the upper end sides of the first accommodating groove SH1_1 and the second accommodating groove SH2_1, and second protrusions PP2 disposed on the lower end sides of the first accommodating groove SH1_1 and the second accommodating groove SH2_1. The first protrusion PP1 and the second protrusion PP2 may have different areas. For example, the second protrusion PP2 may have a larger area than the first protrusion PP1. The second protrusion PP2 may be longer than the first protrusion PP1 in the first direction D1, but exemplary embodiments are not limited thereto.

In some exemplary embodiments, the plurality of first protrusions portions PP1 may be disposed to have the same area, but exemplary embodiments are not limited thereto. That is, the areas of the plurality of first protrusions PP1 may be different from each other, or the areas of some of the plurality of first protrusions PP1 may be equal to each other and the areas of others of the plurality of first protrusions PP1 may be equal to each other, but each of the areas of the some of the plurality of first protrusions PP1 may be different from each of the areas of the others of the plurality of first protrusions PP1.

The first pressure sensor 510 and the second pressure sensor 520 are disposed on the first and second protrusions PP1 and PP2. The first and second protrusions PP1 and PP2 may be arranged corresponding to the plurality of pressure sensing cells CE1 to CEp and CEp+1 shown in FIGS. 13 and 14 so as to overlap the plurality of pressure sensing cells CE1 to CEp and CEp+1. For example, the plurality of first protrusions PP1 may overlap the plurality of first input sensing cells CE1 to CEp, respectively, and the second protrusion PP2 may overlap the second pressure sensing cell CEp+1. Therefore, when the pressure of a user is applied, the first and second protrusions PP1 and PP2 serve to press the plurality of pressure sensing cells CE1 to CEp and CEp+1 depending on the pressure of the user. Each of the plurality of first and second protrusions PP1 and PP2 may be formed to have a smaller area than each of the plurality of pressure sensing cells CE1 to CEp and CEp+1. As such, the first and second protrusions PP1 and PP2 are respectively disposed in the first accommodating groove SH1_1 and the second accommodating groove SH2_1 so that there is an advantage that the pressure concentration bumps 530 disposed on the lower surfaces of the first pressure sensor 510 and the second pressure sensor 520 may be omitted.

When considering the first pressure sensor 510, the first accommodating groove cover MC1, and the first waterproofing member 410 that are disposed on the first protrusion PP1 of the first accommodating groove SH1_1 with reference to FIGS. 19 and 20, the first protrusion PP1 may be disposed on the fourth surface a4 of the first accommodating groove SH1_1, and the first pressure sensor 510, the first accommodating groove cover MC1, and the first waterproofing member 410 may be disposed on the first protrusion PP1.

In some exemplary embodiments, the width WPP of the first protrusion PP1 (defined as a width of the upper surface of the first protrusion PP1) may be smaller than the width WSH of the first accommodating groove SH1_1, and thus, one side surface of the first protrusion PP1, the third surface a3 of the first accommodating groove SH1_1, the other side surface of the first protrusion PP1, and the fifth surface a5 of the first accommodating groove SH1_1 may be spaced apart from each other. However, exemplary embodiments are not limited thereto.

In some exemplary embodiments, the cross-section of the first protrusion PP1 may have an inverted trapezoidal shape, but exemplary embodiments are not limited thereto, and the cross-section of the first protrusion PP1 may have various shapes protruding from the fourth surface a4 of the first accommodating groove SH1_1. Further, the upper surface of the first protrusion PP1 may be a curved surface. For example, the upper surface of the first protrusion PP1 may be a curved surface having the same curvature as the fourth surface a4 of the first accommodating groove SH1_1. However, exemplary embodiments are not limited thereto. The upper surface of the first protrusion PP1 may be a curved surface having a different curvature from the fourth surface a4, and the upper surface of the first protrusion PP1 may be a flat surface. When the first protrusion PP1 has a flat upper surface, there is an advantage that the first pressure sensor 510 can be stably fixed.

The first adhesive member CP1 may be disposed on the upper surface of the first protrusion PP1, and the first pressure sensor 510 may be fixed to the upper surface of the first protrusion PP1 by the first adhesive member CP1. However, exemplary embodiments are not limited thereto, and the first adhesive member CP1 may be disposed on the lower surface of the first pressure sensor 510 to attach and fix the first protrusion PP1 and the first pressure sensor 510 to each other. The first accommodating groove cover MC1 may be disposed on the first pressure sensor 510. The second adhesive member CP2 may be disposed on the lower surface of the first accommodating groove cover MC1 to attach and fix the first accommodating groove cover MC1 to the first pressure sensor 510, and the first waterproofing member 410 may be disposed in the second area DR2 of the middle frame 600 including the first accommodating groove cover MC1.

Figure 21:
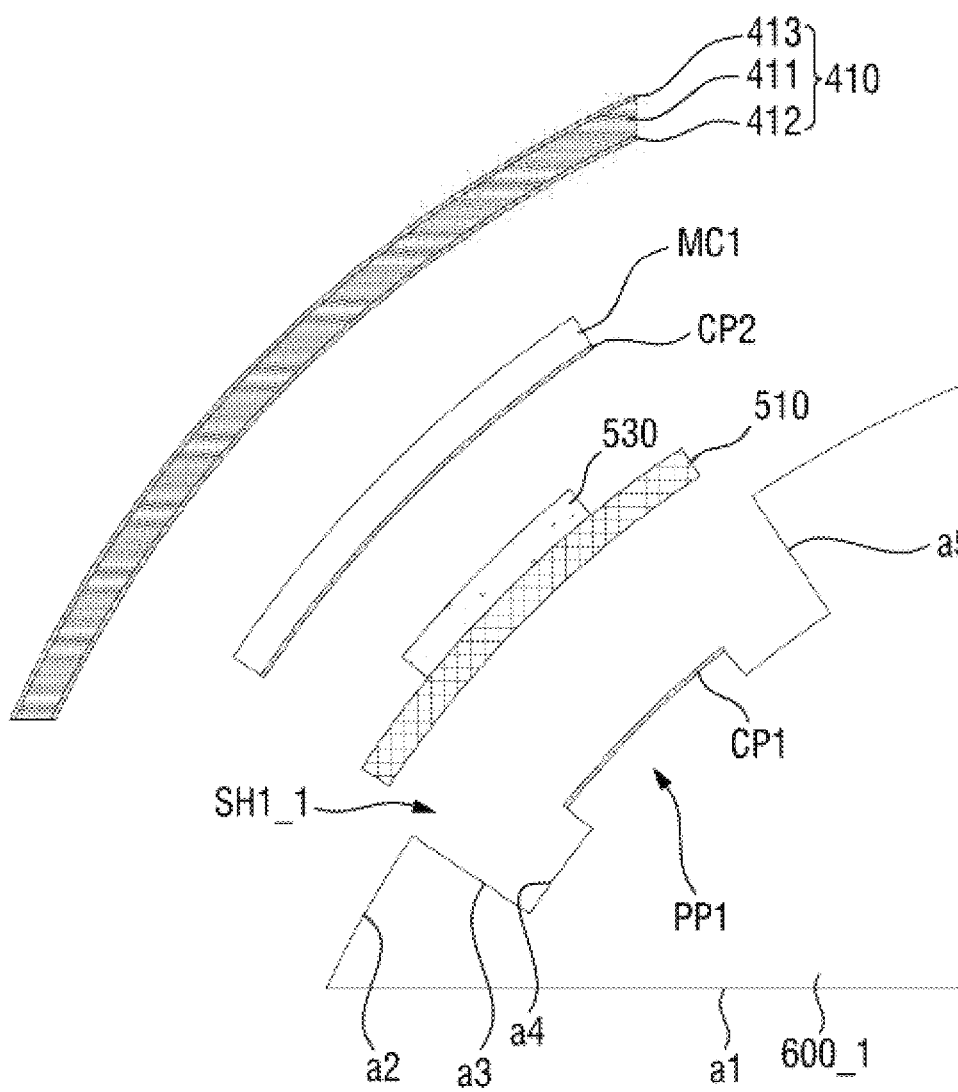
FIG. 21 is an exploded cross-sectional view of a second area of a middle frame according to some exemplary embodiments.
Figure 21:
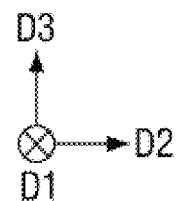
Figure 22:
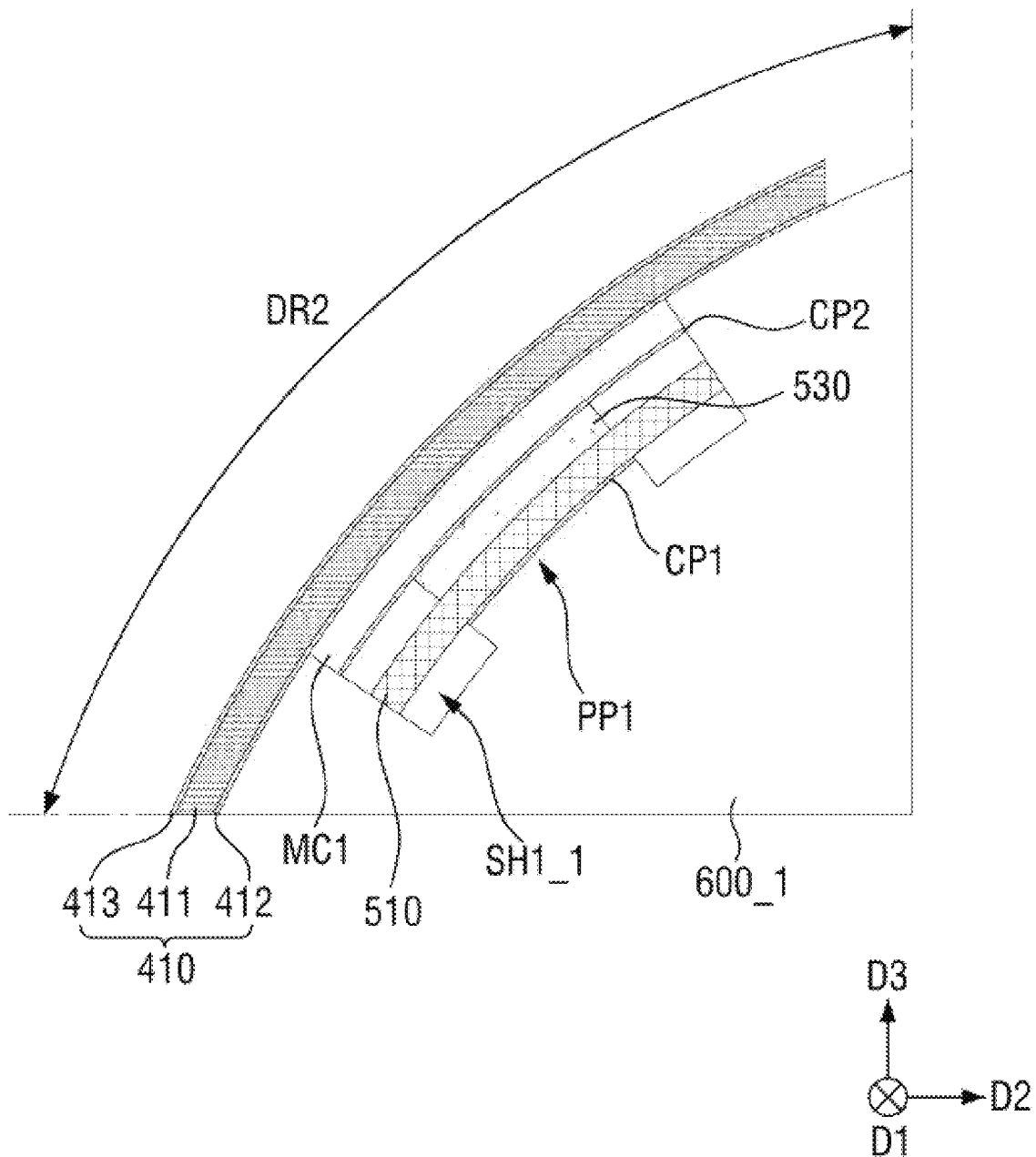
FIG. 22 is an enlarged view of the second area shown in FIG. 21 in an assembled state according to some exemplary embodiments.

FIG. 21 is an exploded cross-sectional view of a second area of a middle frame according to some exemplary embodiments. FIG. 22 is an enlarged view of the second area shown in FIG. 21 in an assembled state according to some exemplary embodiments.

Another exemplary embodiment, which will be described in association with FIGS. 21 and 22, is different from the exemplary embodiment described in association with FIG. 17 in that a pressure concentration bump 530 is disposed on the upper surface of the first pressure sensor 510. As such, a redundant description will be omitted, and differences will be mainly described.

Referring to FIGS. 21 and 22, in some exemplary embodiments, the first protrusion PP1 is disposed in the first accommodating groove SH1_1 disposed in the second area DR2 of the middle frame 600_1, the first pressure sensor 510 is placed on the upper surface of the first protrusion PP1, the pressure concentration bump 530 is disposed on the upper surface of the first pressure sensor 510, and the first accommodating groove cover MC1 is disposed on the upper surface of the pressure concentration bump 530. The first adhesive member CP1 may be disposed on the upper surface of the first protrusion PP1, and the lower surface of the first pressure sensor 510 may be attached and fixed to the upper surface of the first protrusion PP1 by the first adhesive member CP1.

The pressure concentration bump 530 may be disposed on the upper surface of the first pressure sensor 510. The width of the pressure concentration bump 530 may be narrower than the width of the first pressure sensor 510. The pressure concentration bump 530 may be disposed corresponding to the plurality of pressure sensing cells CE1 to CEp and CEp+1 shown in FIGS. 13 and 14 so as to overlap the plurality of pressure sensing cells CE1 to CEp and CEp+1. For example, the plurality of pressure concentration bumps 530 may overlap each other on the plurality of pressure sensing cells CE1 to CEp and CEp+1, and the plurality of first protrusions PP1 may overlap each other under the plurality of pressure sensing cells CE1 to CEp and CEp+1. The width of the first protrusion PP1 and the width of the pressure concentration bump 530 may be equal to each other. However, exemplary embodiments are not limited thereto, and width of the first protrusion PP1 and the width of the pressure concentration bump 530 may be different from each other. The first protrusion PP1 and the pressure concentration bump 530 may concentrate a pressure due to an external force on the pressure sensing layer PSL in each sensing area without scattering the pressure. Accordingly, the sensitivity of the first pressure sensor 510 can be further improved.

The cross-sectional shape of the pressure concentration bump 530 may be a shape symmetrical to the first protrusion PP1. However, exemplary embodiments are not limited thereto, and the cross-sectional shape of the pressure concentration bump 530 and the cross-sectional shape of the first protrusion PP1 may be asymmetric to each other or may be different from each other. The first accommodating groove cover MC1 may be disposed on the pressure concentration bump 530. The second adhesive member CP2 can be disposed on the lower surface of the first accommodating groove cover MC1 to attach and fix the first accommodating groove cover MC1 to the pressure concentration bump 530. However, exemplary embodiments are not limited thereto, and the second adhesive member CP2 may be disposed on the upper surface of the pressure concentration bump 530 to be attached to the first accommodating groove cover MP1. The first waterproofing member 410 may be disposed in the second area DR2 of the middle frame 600_1 including the first accommodating groove cover MC1.

Figure 23:
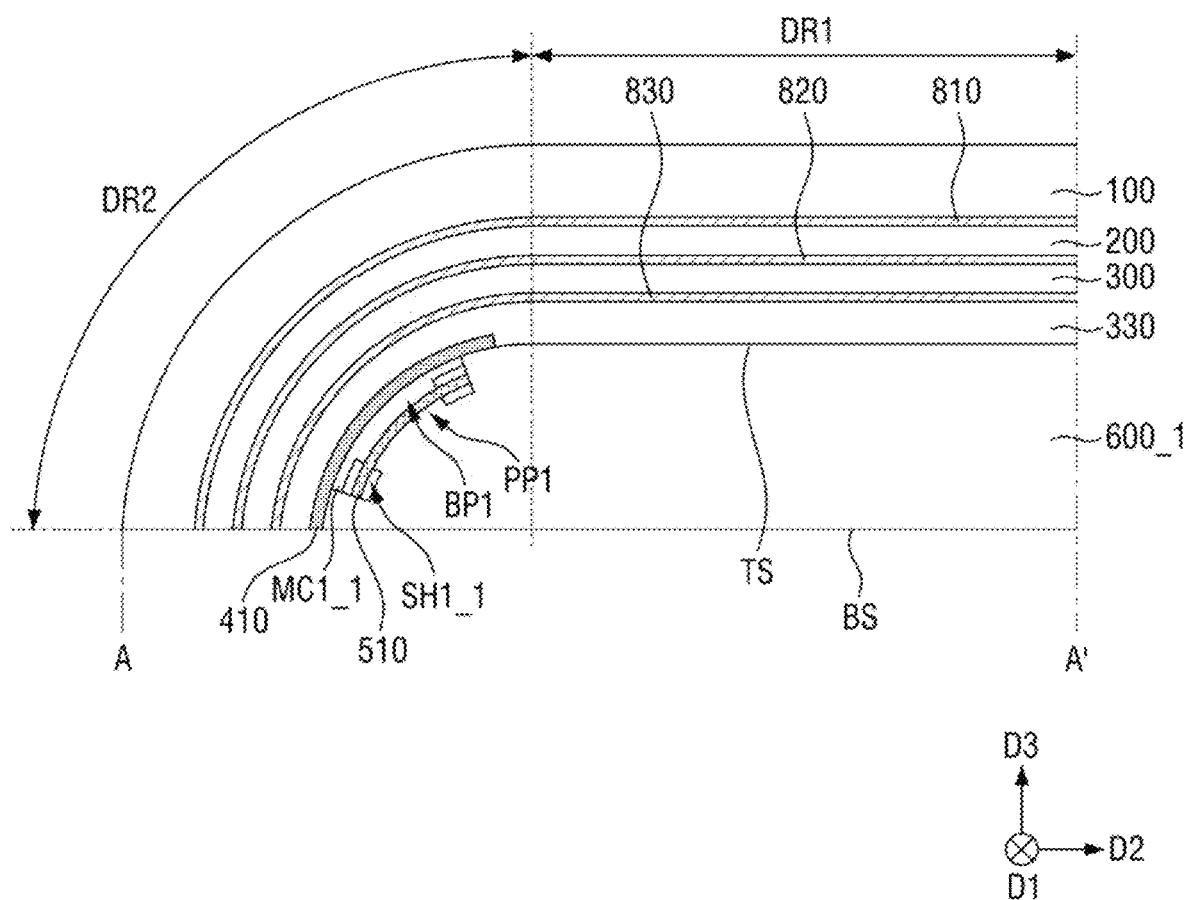
FIG. 23 is a cross-sectional view taken along sectional line A-A' of FIG. 1 according to some exemplary embodiments.
Figure 24:
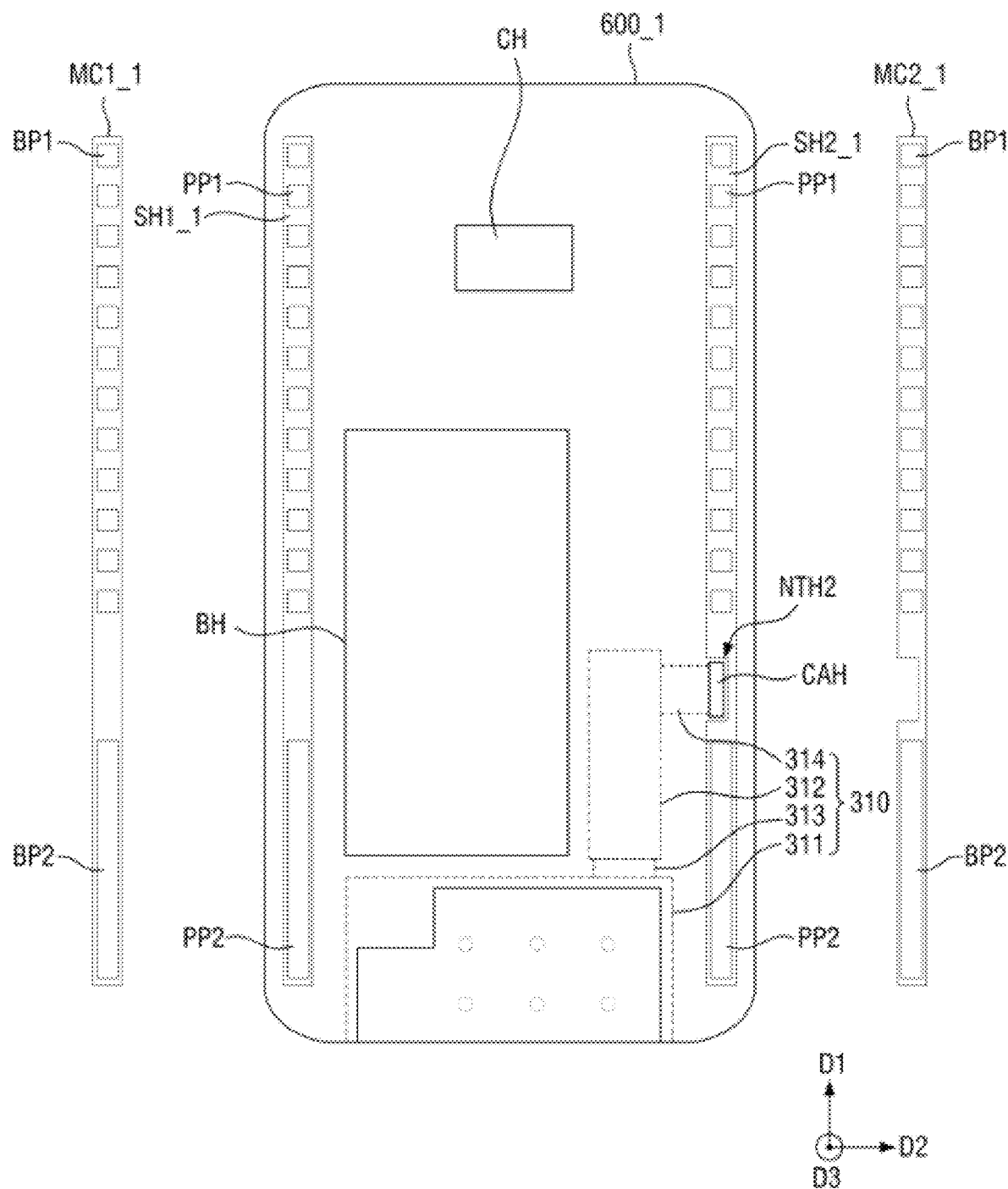
FIG. 24 is a plan view of a middle frame according to some exemplary embodiments.
Figure 25:
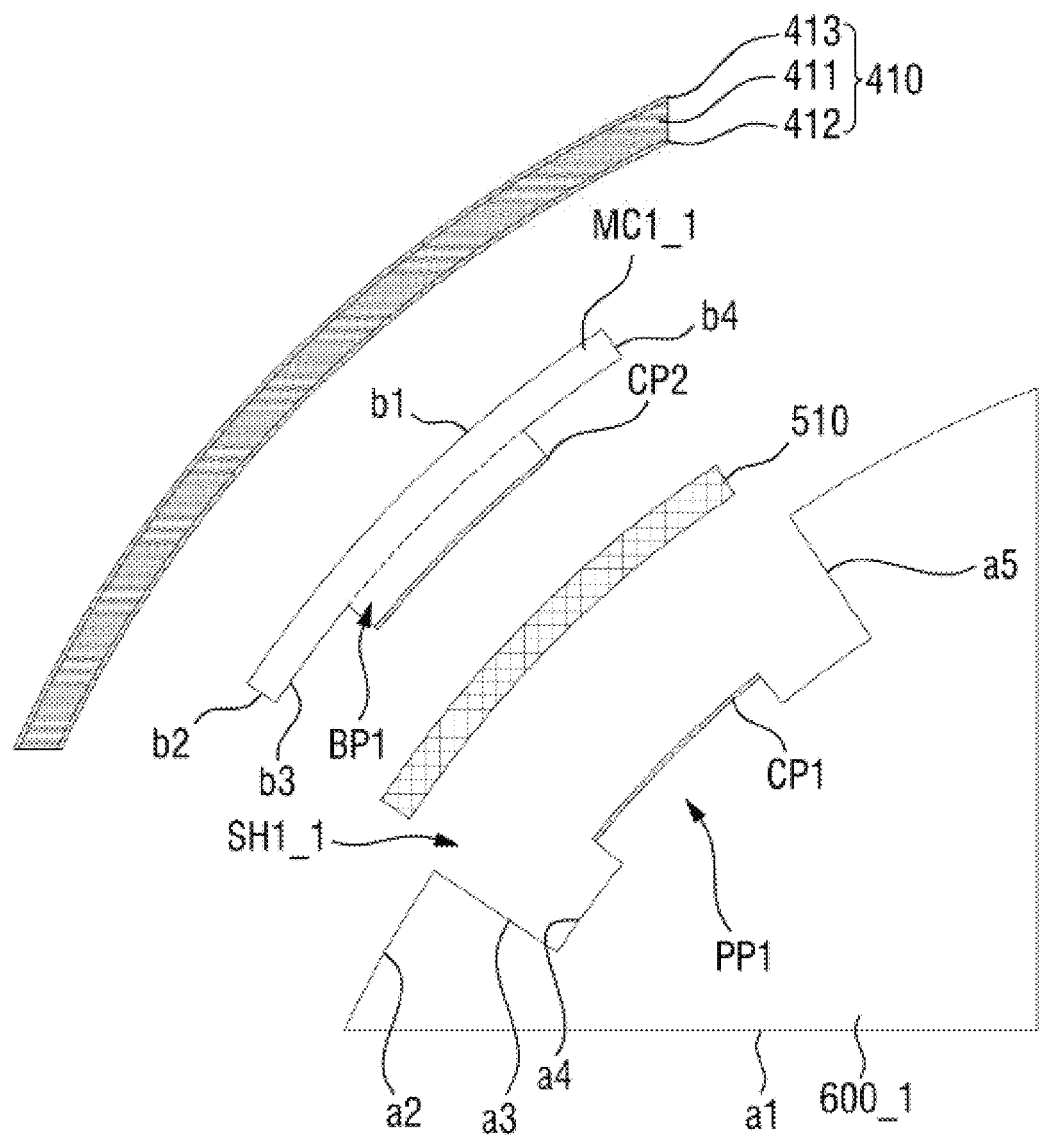
FIG. 25 is an exploded cross-sectional view of the second area of FIG. 23 according to some exemplary embodiments.
Figure 26:
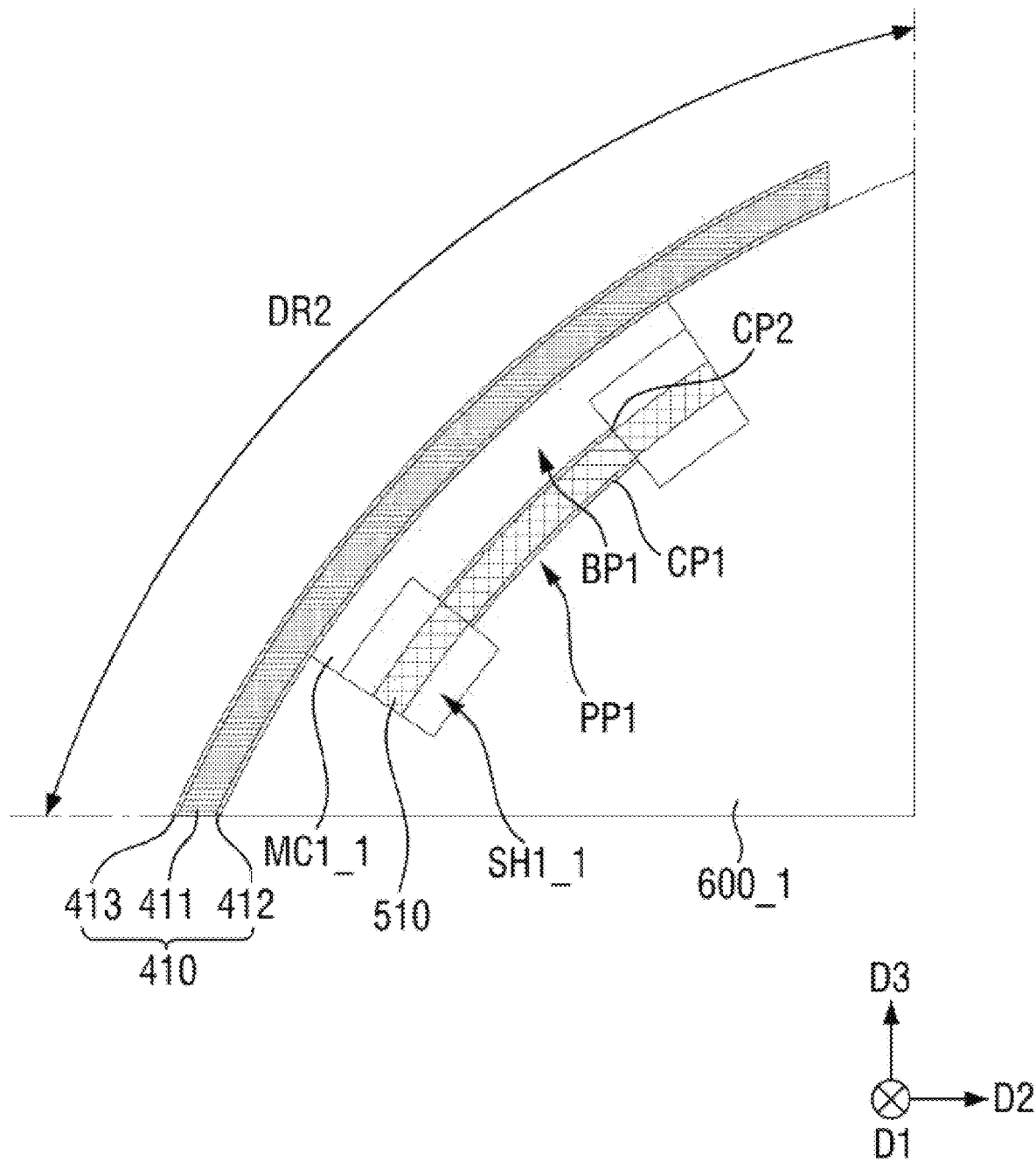
FIG. 26 is an enlarged view of the second area of FIG. 23 according to some exemplary embodiments.

FIG. 23 is a cross-sectional view taken along sectional line A-A' of FIG. 1 according to some exemplary embodiments. FIG. 24 is a plan view of a middle frame according to some exemplary embodiments. FIG. 25 is an exploded cross-sectional view of the second area of FIG. 23 according to some exemplary embodiments. FIG. 26 is an enlarged view of the second area of FIG. 23 according to some exemplary embodiments.

Other exemplary embodiments to be described in association with FIGS. 23 to 26 are different from the exemplary embodiments shown in FIG. 17 in that bumps (e.g., first and second bumps BP1 and BP2) are disposed on an accommodating groove cover, e.g., first accommodating groove cover MC1_1. As such, a redundant description will be omitted, and differences will be mainly described.

Referring to FIG. 23, the first protrusion PP1 is disposed in the first accommodating groove SH1_1 disposed in the second area DR2 of the middle frame 600_1, and the first bump BP1 is disposed on the lower surface of the first accommodating groove cover MC1_1.

When considering the first and second bumps BP1 and BP2 with reference to FIG. 24, the first accommodating groove SH1_1 may be disposed at the left edge of the second area DR2 of the middle frame 600_1, and the second accommodating groove SH2_1 may be disposed at the right edge of the second area DR2 of the middle frame 600_1. The first and second protrusions PP1 and PP2 spaced apart from each other in the first direction D1 are disposed in the first accommodating groove SH1_1 and the second accommodating groove SH2_1. A plurality of first and second bumps BP1 and BP2 spaced apart from each other in the first direction D1 may be disposed on the lower surfaces of the first accommodating groove cover MC1_1 and the second accommodating groove cover MC2_1 respectively covering the first accommodating groove SH1_1 and the second accommodating groove SH2_1. Although it is illustrated in FIG. 24 that the plurality of first and second bumps BP1 and BP2 are arranged in one row, exemplary embodiments are not limited thereto. The plurality of first and second bumps BP1 and BP2 may be arranged in a plurality of rows, if necessary. The plurality of first and second bumps BP1 and BP2 may be arranged to be spaced apart from each other at predetermined intervals, or may be arranged continuously, or variably. The plurality of first and second bumps BP1 and BP2 may include a plurality of first bumps BP1 disposed at the upper end sides of the first accommodating groove cover MC1_1 and the second accommodating groove cover MC2_1, and a plurality of second bumps BP2 disposed at the lower end sides of the first accommodating groove cover MC1_1 and the second accommodating groove cover MC2_1.

The first bump BP1 and the second bump BP2 may have different areas. For example, the second bump BP2 may be disposed to have a larger area than the first bump BP1. The second bump BP2 may be longer than the first bump BP1 in the first direction D1, but exemplary embodiments are not limited thereto. In some exemplary embodiments, the plurality of first bumps BP1 may be disposed to have the same area, but exemplary embodiments are not limited thereto. That is, the areas of the first bumps BP1 may be different from each other, or the areas of some of the plurality of first bumps BP1 are equal to each other and the areas of others of the plurality of first bumps BP1 are equal to each other, but the area of each of the some of the first bumps BP1 and the area of each of the others of the first bumps BP1 may be different from each other.

The first and second bumps BP1 and BP2 may be arranged corresponding to the plurality of pressure sensing cells CE1 to CEp and CEp+1 shown in FIGS. 13 and 14 so as to overlap the plurality of pressure sensing cells CE1 to CEp and CEp+1. For example, the plurality of first bumps BP1 may overlap the plurality of first input sensing cells CE1 to CEp, respectively, and the second bump BP2 may overlap the second pressure sensing cell CEp+1. In some exemplary embodiments, the plurality of first bumps BP1 may correspond to the plurality of first protrusions PP1, and the second bumps BP2 may correspond to the second protrusions PP2. For example, the plurality of first bumps BP1 and second bumps BP2 may overlap each other on the plurality of pressure sensing cells CE1 to Cep and CEp+1, and the plurality of first protrusions PP1 and second protrusions PP2 may overlap each other under the plurality of pressure sensing cells CE1 to Cep and CEp+1. Thus, even when the first and second pressure sensors 510 and 520 are not provided with the pressure concentration bump 530, the first and second bumps BP1 and BP2 and the first and second protrusions PP1 and PP2 may be disposed to concentrate a pressure due to an external force on the pressure sensing layer PSL in each sensing area without scattering the pressure. Accordingly, the sensitivity of the first and second pressure sensors 510 and 520 can be effectively improved.

Referring to FIGS. 25 and 26, the first accommodating groove cover MC1_1 may include a first surface b1, which is an upper surface on which the first waterproofing member 410 is placed, a third surface b3 opposite to the first surface b1, and first and second side surfaces b2 and b4 connecting the first surface b1 and the third surface b3. The third surface b3 of the first accommodating groove cover MC1_1 may be provided with the first bump BP1.

In some exemplary embodiments, the cross-section of the first bump BP1 may have an inverted trapezoidal shape, but exemplary embodiments are not limited thereto, and the cross-section of the first bump BP1 may have various shapes protruding from the third surface b3 of the first accommodating groove cover MC1_1. The lower surface of the first bump BP1 may be a curved surface. For example, the lower surface of the first bump BP1 may be a curved surface having the same curvature as the first surface b1 of the first accommodating groove cover MC1_1. However, exemplary embodiments are not limited thereto. The lower surface of the first bump BP1 may be a curved surface having a different curvature from the first surface b1 of the first accommodating groove cover MC1_1, and the lower surface of the first bump BP1 may be a flat surface. When the first bump BP1 has a flat upper surface, there is an advantage that the first pressure sensor 510 can be stably fixed.

The second adhesive member CP2 may be disposed on the lower surface of the first bump BP1 of the first accommodating groove cover MC1_1 to attach and fix the first accommodating groove cover MC1_1 to the first pressure sensor 510. However, exemplary embodiments are not limited thereto, and the second adhesive member CP2 may be disposed on the upper surface of the first pressure sensor 510 to attach and fix the first bump BP1 and the first pressure sensor 510 to each other. The first waterproofing member 410 may be disposed in the second area DR2 of the middle frame 600_1 including the first accommodating groove cover MC1_1.

The width of the first protrusion PP1 and the width of the first bump BP1 may be equal to each other. However, exemplary embodiments are not limited thereto, and width of the first protrusion PP1 and the width of the first bump BP1 may be different from each other. The cross-sectional shape of the first bump BP1 may be a shape symmetrical to the first protrusion PP1. However, exemplary embodiments are not limited thereto, and the cross-sectional shape of the first bump BP1 and the cross-sectional shape of the first protrusion PP1 may be asymmetric to each other or may be different from each other.

Figure 27:
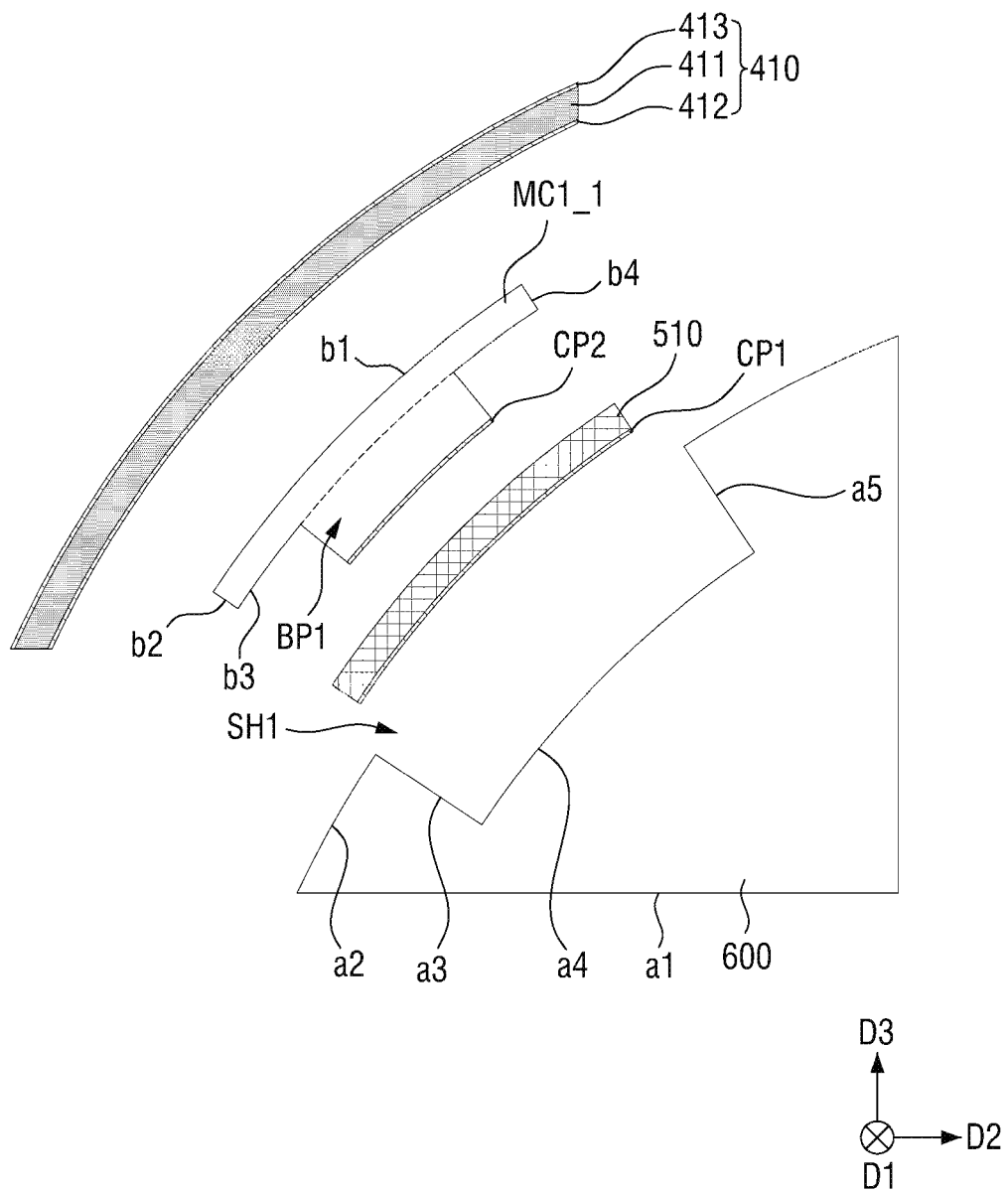
FIG. 27 is an exploded cross-sectional view of a second area of a middle frame according to some exemplary embodiments.
Figure 28:
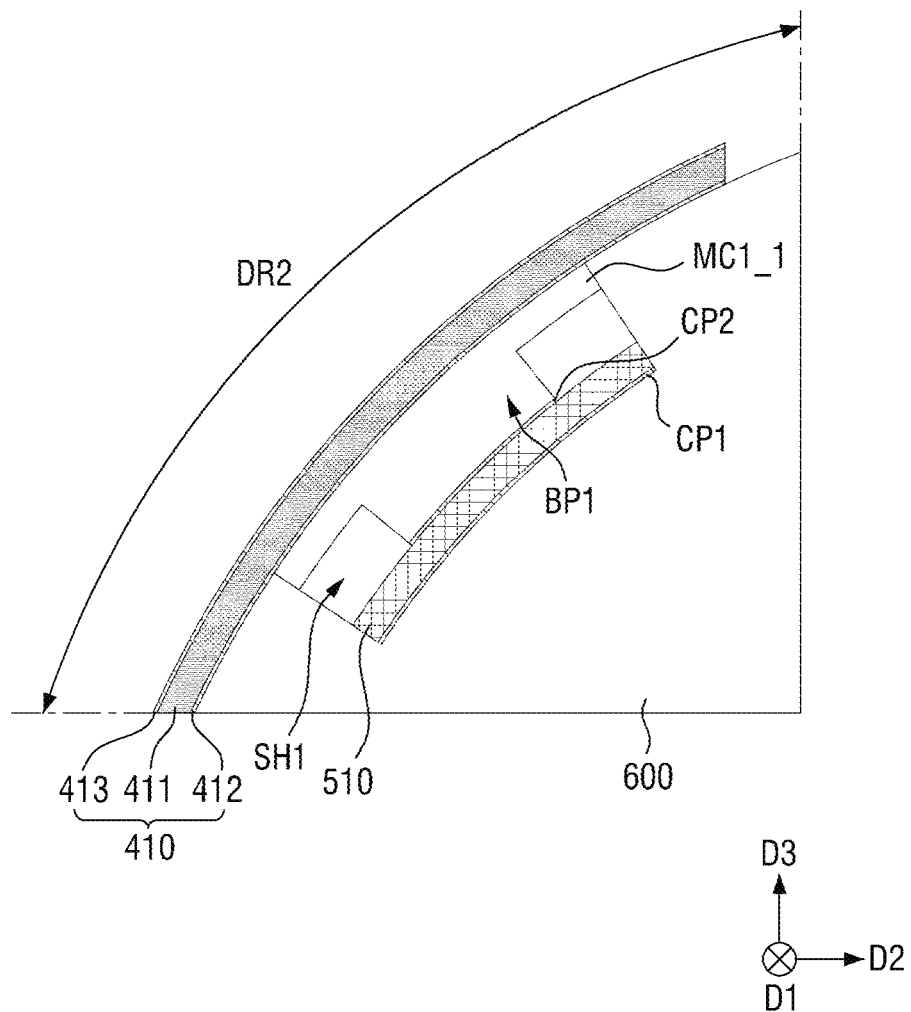
FIG. 28 is an enlarged view of the second area shown in FIG. 27 in an assembled state according to some exemplary embodiments.

FIG. 27 is an exploded cross-sectional view of a second area of a middle frame according to some exemplary embodiments. FIG. 28 is an enlarged view of the second area shown in FIG. 27 in an assembled state according to some exemplary embodiments.

Other exemplary embodiments that will be described in association with FIGS. 27 and 28 are different from the exemplary embodiments described in association with FIG. 23 in that a protrusion is not disposed in an accommodating groove (e.g., a first accommodating groove SH1) of a middle frame 600. As such, a redundant description will be omitted, and differences will be mainly described.

Referring to FIGS. 27 and 28, in some exemplary embodiments, the first accommodating groove SH1 is disposed in the second area DR2 of the middle frame 600, the first pressure sensor 510 is placed on the upper surface of the first accommodating groove SH1, and the first accommodating groove cover MC1_1 is disposed on the upper surface of the first pressure sensor 510. The first adhesive member CP1 may be disposed on the lower surface of the first pressure sensor 510, and the lower surface of the first pressure sensor 510 may be attached and fixed to the upper surface of the first accommodating groove SH1 by the first adhesive member CP1. The first accommodating groove cover MC1_1 may be disposed on the upper surface of the first pressure sensor 510. The first bump BP1 may be disposed on the third surface b3 of the first accommodating groove cover MC1_1. The second adhesive member CP2 may be disposed on the lower surface of the first bump BP1 to attach and fix the first accommodating groove cover MC1_1 to the first pressure sensor 510. The first waterproofing member 410 may be disposed in the second area DR2 of the middle frame 600 including the first accommodating groove cover MC1_1. The lower surface of the first pressure sensor 510 may be placed in the first accommodating groove SH1 to stably fix the first pressure sensor 510, and the first accommodating groove cover MC1_1 may be provided with the first bump BP1 to improve the sensitivity of the first pressure sensor 510. However, exemplary embodiments are not limited thereto. In some exemplary embodiments, the pressure concentration bump 530 may further be disposed on the lower surface of the first pressure sensor 510 in correspondence with the first bump BP1.

Figure 29:
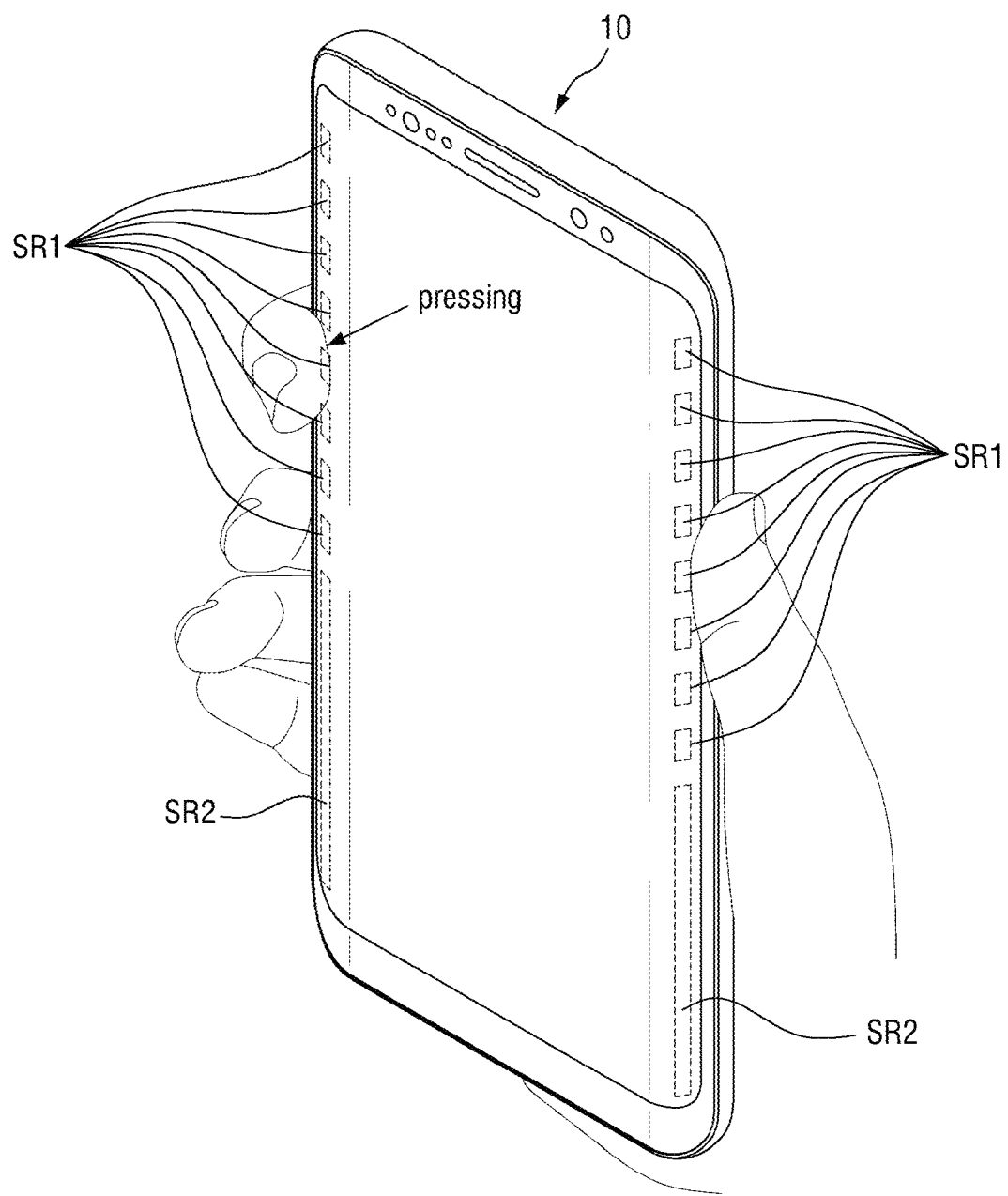
FIGS. 29 and 30 are schematic views showing a method of applying a pressure signal to a display device according to some exemplary embodiments.
Figure 30:
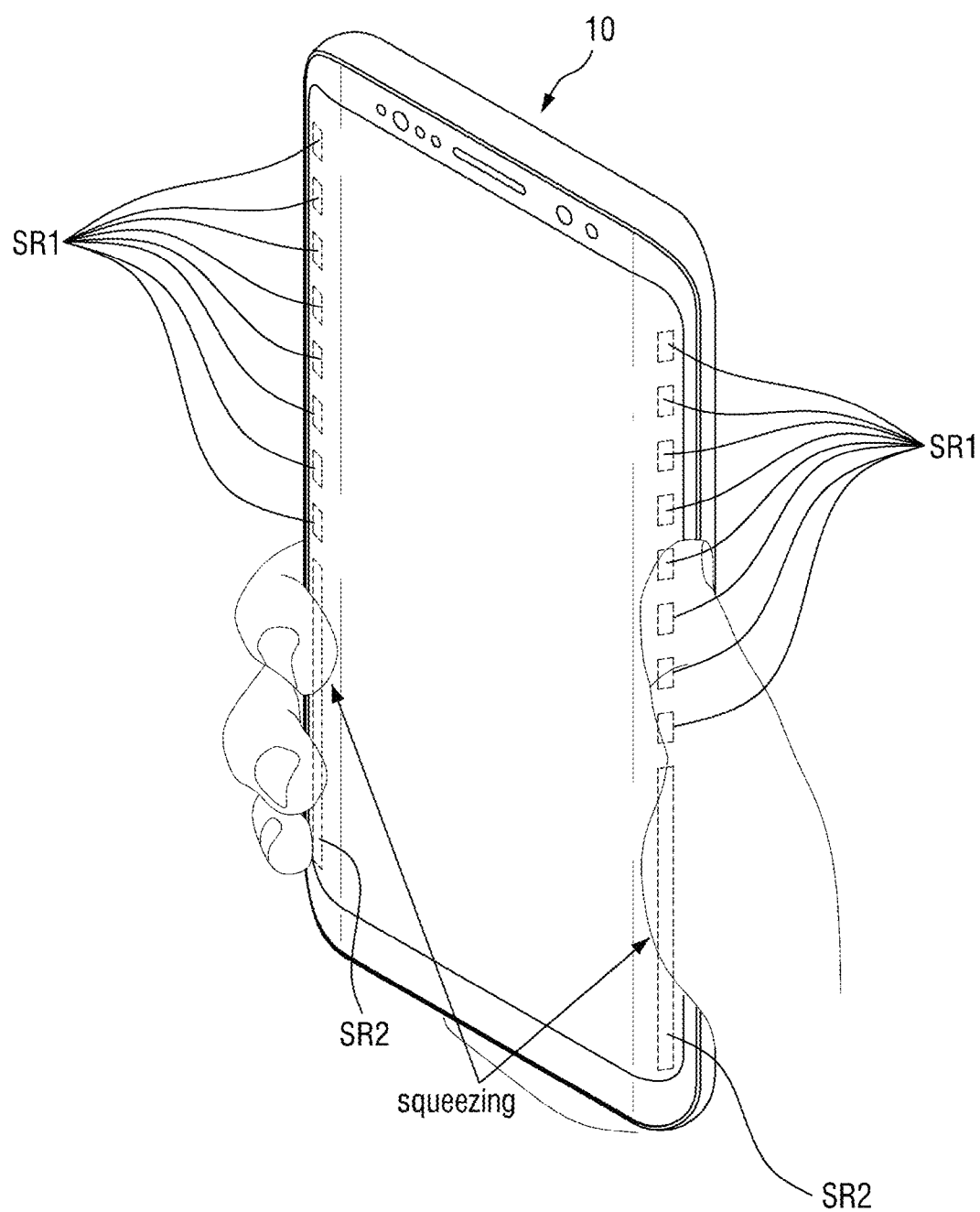

FIGS. 29 and 30 are schematic views showing a method of applying a pressure signal to a display device according to some exemplary embodiments.

FIGS. 29 and 30 illustrate a display device 10 applied as a smart phone. In the display device 10 of FIGS. 29 and 30, a physical input button is omitted at the long side of the display device 10, and a pressure sensor is disposed at that position instead of the physical input button. FIG. 29 shows a case where the first sensing area SR1 is used as a pressing operation recognition area. That is, FIG. 29 shows a shape in which a position is pressed with a forefinger while the display device 10 is gripped with a finger. The first sensing area SR1 of the first and second pressure sensors 510 and 520 is disposed at the position. When pressure is applied to the first sensing area SR1, the resistance of the pressure sensing layer PSL changes, and the sensing electrodes RE1 and RE2 sense the resistance change to determine whether the pressure is applied to the position and determine the intensity of the pressure. A preprogrammed operation of the display device 10 may be outputted according to the pressure applied to the specific position and/or the intensity thereof. For example, preprogrammed functions, such as screen adjustment, screen lock, screen conversion, application call, application execution, picture taking, call reception, and the like, may be performed. Different operations may be preprogrammed for different first sensing areas SR1. Therefore, as the number of the first sensing areas SR1 increases, more various outputs of the display device 10 may be easily produced.

FIG. 30 shows a case where the second sensing area SR2 is used as a squeezing operation recognition area. That is, FIG. 30 shows a shape in which a relatively large area is squeezed using a palm and fingers while the display device 10 is gripped with a finger. The second sensing area SR2 is disposed in an area where the squeezing is performed to determine whether pressure is applied by the squeezing and determine the intensity of the pressure. Thus, a preprogrammed operation of the display device 10 may be performed. The squeezing may be performed by an action of naturally applying force to the entire hand while gripping the display device 10. The squeezing operation can be performed quickly without motion of an elaborate hand while gripping the display device 10, and thus, simpler and faster input is possible. Therefore, the second sensing area SR2 may be used as an input means for a frequently used function or a program requiring rapidity, such as snapshot.

According to various exemplary embodiments, the sensitivity of a pressure sensor of a display device can be improved and malfunction due to moisture penetration can be prevented. Moreover, an input method can be simplified. The effects of the inventive concepts are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
   a cover;
   a display panel disposed on the cover;

a middle frame disposed between the cover and the display panel, the middle frame comprising a first accommodating groove facing and extending along a first long side of the display panel; and a first pressure sensor disposed in the first accommodating groove, wherein:
the middle frame comprises a flat portion and a curved portion; and
the first accommodating groove is provided in the curved portion of the middle frame.

2. The display device of claim 1, further comprising:
a first accommodating groove cover disposed on the first pressure sensor in the first accommodating groove.

3. The display device of claim 2, further comprising:
a first waterproofing member disposed on the first accommodating groove cover.

4. The display device of claim 3, wherein:
an upper surface of the first waterproofing member is attached to the display panel; and
a lower surface of the first waterproofing member is attached to the first accommodating groove cover.

5. The display device of claim 3, wherein an area of the first waterproofing member is greater than an area of the first accommodating groove cover.

6. The display device of claim 3, wherein the curved portion has a first curvature.

7. The display device of claim 6, wherein the accommodating groove cover has a second curvature equal to the first curvature.

8. The display device of claim 3, wherein the first pressure sensor comprises a plurality of pressure sensing cells.

9. The display device of claim 8, wherein the first accommodating groove comprises a plurality of protrusions corresponding to the plurality of pressure sensing cells.

10. The display device of claim 8, wherein the first accommodating groove cover comprises a plurality of bumps corresponding to the plurality of pressure sensing cells.

11. The display device of claim 8, wherein a plurality of pressure concentration bumps corresponding to the plurality of pressure sensing cells are arranged on the upper surface of the first pressure sensor.

12. The display device of claim 8, wherein a plurality of pressure concentration bumps corresponding to the plurality of pressure sensing cells are arranged on the lower surface of the first pressure sensor.

13. The display device of claim 1, wherein the middle frame further comprises:
a second accommodating groove extending along a second long side of the display panel facing the first long side; and
a second pressure sensor disposed in the second accommodating groove.

14. The display device of claim 13, further comprising:
a second accommodating groove cover disposed on the second pressure sensor in the second accommodating groove.

15. The display device of claim 14, further comprising:
a second waterproofing member disposed on the second accommodating groove cover.

16. The display device of claim 1, wherein the middle frame comprises:
a cable hole penetrating the middle frame; and
a first concave portion adjacent to one side of the first accommodating groove and exposing the cable hole.

17. A display device comprising:
a display panel;
a middle frame disposed under the display panel, the middle frame comprising a first accommodating groove extending along a first long side of the display panel;
a first pressure sensor disposed in the first accommodating groove;
a cable hole penetrating the middle frame; and
a first concave portion adjacent to one side of the first accommodating groove and exposing the cable hole,
wherein each of the first accommodating groove and the first pressure sensor comprises a second concave portion adjacent to one side thereof and exposing the cable hole.

18. The display device of claim 17, wherein a width of the first concave portion is smaller than a width of the second concave portion.

19. The display device of claim 18, further comprising:
a display circuit board attached to one side of the display panel and bent toward the lower surface of the display panel; and
a cable connected to the display circuit board and passing through the cable hole.

20. The display device of claim 19, further comprising:
a main circuit board disposed on the lower surface of the middle frame,
wherein the cable is connected to a main connector disposed on the lower surface of the main circuit board.

* * * * *